US012196336B2

(12) United States Patent
Yakos et al.

(10) Patent No.: US 12,196,336 B2
(45) Date of Patent: Jan. 14, 2025

(54) ELECTROMAGNETICALLY ACTIVATED RISING STEM VALVE

(71) Applicant: MagDrive Technologies, Inc., Bozeman, MT (US)

(72) Inventors: David Yakos, Bozeman, MT (US); Stephen Sanford, Bozeman, MT (US); Robert K. Burgess, Sheridan, WY (US)

(73) Assignee: MagDrive Technologies, Inc., Bozeman, MT (US)

( * ) Notice: Subject to any disclaimer, the term of this patent is extended or adjusted under 35 U.S.C. 154(b) by 0 days.

(21) Appl. No.: 18/409,266

(22) Filed: Jan. 10, 2024

(65) Prior Publication Data

US 2024/0240727 A1   Jul. 18, 2024

Related U.S. Application Data

(60) Provisional application No. 63/438,687, filed on Jan. 12, 2023.

(51) Int. Cl.
| | |
|---|---|
| *F16K 31/06* | (2006.01) |
| *F16K 3/314* | (2006.01) |
| *F16K 31/60* | (2006.01) |
| *F16K 3/12* | (2006.01) |
| *F16K 27/04* | (2006.01) |

(52) U.S. Cl.
CPC ......... *F16K 31/0668* (2013.01); *F16K 3/314* (2013.01); *F16K 31/60* (2013.01); *F16K 3/12* (2013.01); *F16K 27/048* (2013.01); *F16K 2200/501* (2021.08)

(58) Field of Classification Search
CPC .... F16K 31/043; F16K 31/041; F16K 31/042; F16K 31/082; F16K 5/0647
See application file for complete search history.

(56) References Cited

U.S. PATENT DOCUMENTS

| | | | |
|---|---|---|---|
| 4,452,423 A | * | 6/1984 | Beblavi ..................... F16K 1/02 251/88 |
| 6,460,567 B1 | | 10/2002 | Hansen et al. |
| 6,848,401 B2 | | 2/2005 | Takenaka et al. |
| 7,325,780 B2 | | 2/2008 | Arai et al. |
| 7,971,855 B2 | | 7/2011 | Burgess et al. |
| 8,496,228 B2 | | 7/2013 | Burgess et al. |
| 9,377,121 B2 | | 6/2016 | Burgess et al. |
| 9,702,469 B2 | | 7/2017 | Burgess et al. |

(Continued)

*Primary Examiner* — Umashankar Venkatesan
(74) *Attorney, Agent, or Firm* — NEO IP

(57) ABSTRACT

An electromagnetic rising stem valve includes a stopper configured to block flow of fluid within a pipe. The stopper is connected to a shaft configured to be rotated via an electromagnetic force generated between magnets attached to the outside of the shaft and magnets surrounding an outside surface of a section of the valve. The rising stem valve is further able to include a second shaft which is directly rotated by the electromagnetic force, to open, closed, and one or more semi-open positions, and which is coupled to the shaft connected to the stopper via gearing. Advantageously, the one or more shafts and any gearing is entirely contained within a gear housing, with the electromagnetic force being generated by interaction with magnets outside the housing entirely, preventing unwanted leakage of fluid from the pipe into the environment.

15 Claims, 21 Drawing Sheets

(56) References Cited

U.S. PATENT DOCUMENTS

| | | | |
|---|---|---|---|
| 9,797,521 B1 * | 10/2017 | Davis | ........................ F16K 3/12 |
| 10,221,959 B1 | 3/2019 | Davis | |
| 10,731,770 B2 | 8/2020 | Kawase et al. | |
| 11,047,499 B2 * | 6/2021 | Davis | ...................... F16K 31/05 |
| 2009/0078894 A1 | 3/2009 | Davies, Jr. | |

* cited by examiner

ELECTROMAGNETICALLY ACTIVATED RISING STEM VALVE

CROSS REFERENCES TO RELATED APPLICATIONS

This application claims priority to and the benefit of U.S. Provisional Patent Application No. 63/438,687, filed Jan. 12, 2023, which is incorporated herein by reference in its entirety.

BACKGROUND OF THE INVENTION

1. Field of the Invention

The present invention relates to control valves especially designed for gas and petroleum lines, and more specifically to electromagnetically operated rising stem valves.

2. Description of the Prior Art

It is generally known in the prior art to provide valves for permitting or blocking flow through pipes, including solenoid valves, utilizing magnetic force to rotate valve stems.

Prior art patent documents include the following:

U.S. Pat. No. 6,460,567 for Sealed motor driven valve by inventors Hansen et al., filed Nov. 24, 1999 and issued Oct. 8, 2002, discloses a motor operated valve including a valve body with an inlet and outlet and a valve seat therebetween. A valve core reciprocates between open and closed positions by threads of the valve core cooperating with threads on a shaft which rotates with the armature of the motor. The armature has a plurality of spaced apart permanent magnets, a bearing assembly, and is enclosed by a magnetically transparent enclosure closed at one end and hermetically sealed at its other end to the valve body. Lying closely outside the enclosure is a drive stator that includes drive windings and plural Hall-effect devices for commutation of the windings.

U.S. Pat. No. 10,731,770 for Electric flow control valve and actuator by inventors Kawase et al., filed Jul. 7, 2016 and issued Aug. 4, 2020, discloses an actuator including a rod, an electric motor to generate a rotational driving force on supply of electricity, an output shaft to output the rotational driving force of the electric motor to the rod, a feed screw mechanism, and a rotation prevention mechanism. The feed screw mechanism includes a female screw portion formed on one of the output shaft and the rod, and a male screw portion formed on the other to mesh with the female screw portion. The rotation prevention mechanism is configured to regulate rotation of the rod caused by the rotational driving force of the electric motor.

U.S. Pat. No. 7,325,780 for Motor operated valve with reduction gear by inventors Arai et al., filed Dec. 9, 2005 and issued Feb. 5, 2008, discloses a small-sized motor operated valve that has high output and high resolution by housing a reduction gear together with a rotor in a single can. A valve shaft having a valve member is inserted to a motor operated valve body. A rotor is disposed inside a can attached to the body, and inside the rotor is housed a reduction gear. The output of the rotor is input to a sun gear and transmitted to planetary gears. The planetary gears are engaged both with the fixed gear and the output gear, and the output gear is driven at reduced speed by a large reduction ratio. The output of the output gear is transmitted via a driver to a screw shaft, where it is converted into a linear movement and transmitted to the valve shaft.

U.S. Pat. No. 10,221,959 for Higher speed lower torque magnetic valve actuator by inventor Davis, filed Oct. 3, 2018 and issued Mar. 5, 2019, discloses various devices and techniques related to magnetically-actuated valves. In some examples, magnetically-actuated valves may include mechanisms to provide mechanical advantage such that the torques or forces applied to the valve member are higher than the torques or forces transmitted across the sealed valve enclosure by the magnetic coupling. In some examples, valves may employ mechanisms coupled to the external actuator with inverse mechanical advantage that better match traditional or convenient actuation rates of other valves.

U.S. Pat. No. 8,496,228 for Planetary gear ball valve by inventors Burgess et al., filed Jan. 28, 2012 and issued Jul. 30, 2013, discloses a stemless ball valve comprising a first flange, second flange, ball, inner magnetic cartridge, outer magnetic cartridge, and planetary gear assembly. The inner magnetic cartridge is situated inside of the outer magnetic cartridge, and the inner and outer magnetic cartridges actuate the valve. The planetary gear assembly is situated between the inner magnetic cartridge and the ball. The planetary gear assembly comprises one or more planetary gear phases, each planetary gear phase comprising a step-down gear. Each planetary gear phase comprises one or more planetary gears that engage with the inner teeth of the outer ring of the planetary gear assembly and with a step-down gear. The invention further comprises a pressure equalization system comprising inner and outer equalization tubes, a piston situated between the inner and outer equalization tubes, and either a piston spring or spring washer stack that biases the piston in the direction of the clean oil.

U.S. Pat. No. 9,377,121 for Leak-free rotary valve with internal worm gear by inventors Burgess et al., filed Nov. 18, 2012 and issued Jun. 28, 2016, discloses a rotary valve assembly composing a leak-free enclosure containing a worm gear and a pinion gear, an adapter plate that is situated between a rotary valve body and the enclosure and that secures the rotary valve body to the enclosure, and a magnetic actuator assembly. The worm gear engages with the pinion gear such that when the worm gear rotates, the pinion gear rotates as well. The enclosure is situated between the magnetic actuator assembly and the rotary valve body. A shaft extends through the center of the pinion gear and causes a valve within the rotary valve body to open and close based on rotation of the shaft. In an alternate embodiment, the invention is a rotary valve as described above with an integral adapter plate.

U.S. Pat. No. 7,971,855 for Stemless ball valve by inventors Burgess et al., filed Dec. 9, 2008 and issued Jul. 5, 2011, discloses a stemless ball valve comprising two flanges and a ball with a channel, two axis pins and two travel pins. One end of each axis and travel pin is fixedly attached to the ball, and the other end of each axis pin is lodged into a notch in the first or second flange such that the axis pin is allowed to rotate in the notch. The guide sleeve comprises two channels, and one end of each travel pin is situated within one of the two channels in the guide sleeve. An outer magnetic cartridge causes the inner magnetic cartridge and guide sleeve to rotate, and when the guide sleeve rotates, the travel pins move up and down within the channels in the guide sleeve. The movement of the travel pins within the channels in the guide sleeve causes the ball to rotate, thereby opening and closing the ball valve.

U.S. Pat. No. 6,848,401 for Valve timing adjusting device by inventors Takenaka et al., filed Apr. 21, 2003 and issued Feb. 1, 2005, discloses a valve timing adjusting device adjusting valve timing by shifting rotational phase of a camshaft relative to a crankshaft. The device has an electric motor for rotating a rotor member that drives and moves a phase defining member to a required position. The phase defining member defines the rotational phase of the camshaft in accordance with the position itself. The phase defining member may be a planetary gear rotatably supported on an eccentric shaft as the rotor member. The planetary gear works as both a reduction mechanism and a phase shifting mechanism. The phase defining member may be a control pin slidably supported on a rotatable member as the rotor member. A planetary gear may be additionally used as the reduction mechanism for rotating the rotatable member. It is possible to control the phase with high accuracy and durability.

U.S. Pat. No. 9,702,469 for Leak-free rising stem valve with ball screw actuator by inventors Burgess et al., filed Nov. 11, 2015 and issued Jul. 11, 2017, discloses a rising stem valve with a magnetic actuator having an outer and as inner magnet assembly that are magnetically coupled to each other so that the inner and outer magnet assemblies rotate together and a ball screw that is connected to the rising stem valve and that converts rotary to reciprocal motion. The inner magnetic cartridge assembly and valve body comprise a sealed lower section that is completely sealed to the outside environment.

SUMMARY OF THE INVENTION

The present invention relates to control valves especially designed for gas and petroleum lines, and more specifically to electromagnetically operated rising stem valves.

It is an object of this invention to provide a rising stem valve using electromagnetic opening and closing mechanisms having improved gear ratios.

In one embodiment, the present invention is directed to a magnetically activated rising stem valve, including a first shaft including a stopper at a first end, wherein the stopper is configured to block a pipe when the valve is in a closed position, a second shaft, including a distal end rotationally coupled to a second end of the first shaft, such that rotation of the second shaft causes rotation of the first shaft, an inner magnetic element attached to a proximal end of the second shaft, a valve housing surrounding the first shaft, the second shaft, and the inner magnetic element, wherein the valve housing is sealed and defines a pressure vessel of the valve, an outer magnetic cartridge surrounding a section of the valve housing around the inner magnetic element, and an actuator configured to activate one or more electromagnets in the outer magnetic cartridge, wherein actuation of the one or more electromagnets does not physically rotate the outer magnetic cartridge relative to the inner magnetic element, and wherein the first shaft and the second shaft are rotationally coupled by at least one gear element.

In another embodiment, the present invention is directed to a magnetically activated rising stem valve, including a first shaft including a stopper at a first end, wherein the stopper is configured to block a pipe when the valve is in a closed position, a second shaft, including a distal end rotationally coupled to a second end of the first shaft, such that rotation of the second shaft causes rotation of the first shaft, an inner magnetic element attached to a proximal end of the second shaft, a valve housing surrounding the first shaft, the second shaft, and the inner magnetic element, wherein the valve housing is sealed and defines a pressure vessel of the valve, and an outer magnetic cartridge surrounding a section of the valve housing around the inner magnetic element, wherein the first shaft and the second shaft are rotationally coupled by at least one gear element, including a worm gear attached to the distal end of the second shaft, and wherein a central axis of the first shaft is substantially orthogonal to a central axis of the second shaft.

In yet another embodiment, the present invention is directed to a magnetically activated rising stem valve, including a first shaft including a stopper at a first end, wherein the stopper is configured to block a pipe when the valve is in a closed position, a second shaft, including a distal end rotationally coupled to a second end of the first shaft, such that rotation of the second shaft causes rotation of the first shaft, an inner magnetic element attached to a proximal end of the second shaft, a valve housing surrounding the first shaft, the second shaft, and the inner magnetic element, wherein the valve housing is sealed and defines a pressure vessel of the valve, and an outer magnetic cartridge surrounding a section of the valve housing around the inner magnetic element, wherein the first shaft and the second shaft are rotationally coupled by at least one gear element, wherein the first shaft is part of a preexisting valve system, and the second shaft, the valve housing, and the outer magnetic cartridge are retrofit around the first shaft, and wherein the pipe transports petroleum or natural gas.

These and other aspects of the present invention will become apparent to those skilled in the art after a reading of the following description of the preferred embodiment when considered with the drawings, as they support the claimed invention.

DETAILED DESCRIPTION

Figure 1:
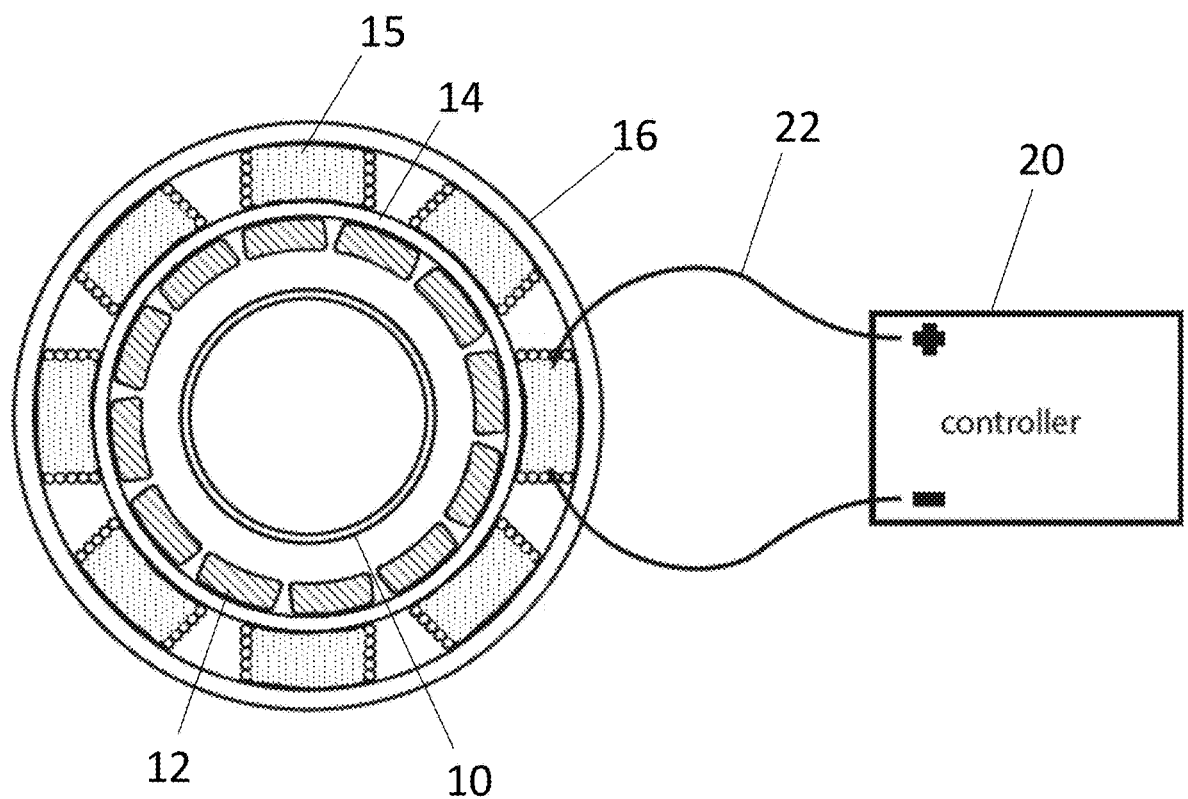
FIG. 1 illustrates a top sectional view of an electromagnetic control valve according to one embodiment of the present invention.

The present invention is generally directed to control valves especially designed for gas and petroleum lines, and more specifically to electromagnetically operated control valves.

In one embodiment, the present invention is directed to a magnetically activated rising stem valve, including a first shaft including a stopper at a first end, wherein the stopper is configured to block a pipe when the valve is in a closed position, a second shaft, including a distal end rotationally coupled to a second end of the first shaft, such that rotation of the second shaft causes rotation of the first shaft, an inner magnetic element attached to a proximal end of the second shaft, a valve housing surrounding the first shaft, the second shaft, and the inner magnetic element, wherein the valve housing is sealed and defines a pressure vessel of the valve, an outer magnetic cartridge surrounding a section of the valve housing around the inner magnetic element, and an actuator configured to activate one or more electromagnets in the outer magnetic cartridge, wherein actuation of the one or more electromagnets does not physically rotate the outer magnetic cartridge relative to the inner magnetic element, and wherein the first shaft and the second shaft are rotationally coupled by at least one gear element.

In another embodiment, the present invention is directed to a magnetically activated rising stem valve, including a first shaft including a stopper at a first end, wherein the stopper is configured to block a pipe when the valve is in a closed position, a second shaft, including a distal end rotationally coupled to a second end of the first shaft, such that rotation of the second shaft causes rotation of the first shaft, an inner magnetic element attached to a proximal end of the second shaft, a valve housing surrounding the first shaft, the second shaft, and the inner magnetic element, wherein the valve housing is sealed and defines a pressure vessel of the valve, and an outer magnetic cartridge surrounding a section of the valve housing around the inner magnetic element, wherein the first shaft and the second shaft are rotationally coupled by at least one gear element, including a worm gear attached to the distal end of the second shaft, and wherein a central axis of the first shaft is substantially orthogonal to a central axis of the second shaft.

In yet another embodiment, the present invention is directed to a magnetically activated rising stem valve, including a first shaft including a stopper at a first end, wherein the stopper is configured to block a pipe when the valve is in a closed position, a second shaft, including a distal end rotationally coupled to a second end of the first shaft, such that rotation of the second shaft causes rotation of the first shaft, an inner magnetic element attached to a proximal end of the second shaft, a valve housing surrounding the first shaft, the second shaft, and the inner magnetic element, wherein the valve housing is sealed and defines a pressure vessel of the valve, and an outer magnetic cartridge surrounding a section of the valve housing around the inner magnetic element, wherein the first shaft and the second shaft are rotationally coupled by at least one gear element, wherein the first shaft is part of a preexisting valve system, and the second shaft, the valve housing, and the outer magnetic cartridge are retrofit around the first shaft, and wherein the pipe transports petroleum or natural gas.

In order to prevent leakage of potentially harmful fluids, it is important that many pipelines (e.g., oil and gas pipelines, pipelines holding noxious chemicals, cryogenic hydrogen or helium pipelines) remain fully sealed. Preventing leakage requires reliable valve mechanisms that both allow an operator to halt flow of fluid through the pipeline and which prevent leakage of the fluid through the valve mechanism. The issue of leakage has become especially poignant in recent years, as fugitive emissions have been discovered to have occurred at a much greater scale than previously imagined, increasing the need for a truly sealed system.

At the point where current valves are attached to a pipe, typically a stem is attached to a valve mechanism within the pipe (e.g., gate valve, globe valve, plug valve, ball valve, butterfly valve, needle valve, etc.). A handle is then attached to the stem such that an operator is able to turn the handle in order to open or close the valve. In order to prevent fluid flowing within the pipe from leaking, it is required to tightly seal the area where the stem rises through the side wall of the pipe. Typically, seals, sometimes called packing, take the form of gaskets, or O-rings, surrounding the stem of the valve. However, especially in high pressure situation as with oil and natural gas pipelines, these O-rings tend to fail over time and begin to allow some leakage. Occasionally, these leaks are catastrophic and cause fluid loss and frequently causing environmental damage and health care risks. Therefore, a more reliable method is needed to prevent fluid leakage from valves.

Solenoid valves are known in the art. Solenoid valves use an electromagnet (e.g., the solenoid) surrounding a movable permanent magnetic (e.g., ferromagnetic) core, where activation of the solenoid by application of electric current causes the permanent ferromagnetic core to move, thereby opening or close the valve. However, a fault of current solenoidal valves is that most lack the ability to apply sufficient torque in order to be used in larger, higher pressure pipelines, such as oil and natural gas pipelines. Some mechanisms have previously been proposed in patents such as U.S. Pat. Nos. 8,496,228 and 8,690,119, including planetary gear mechanisms, but these mechanisms tend to be complicated and potentially quite expensive.

AS opposed to solenoid valves, in one embodiment of the present invention, the non-moving electromagnetic cartridge pulses north and south, driving the inner magnetic cartridge, and allowing for multiple rotations of the inner magnetic cartridge. This is distinct from solenoid valves that power electromagnets to just one specific position at a low torque. This allows the valve to get increased torque through multiple turns of the gears, and it allows for a wide range of positioning of the valve closure, like a control valve, not just being limited to open and closed positions.

The present invention solves an unmet need in the art by providing a fully sealed mechanism for raising and lowering a rising stem valve by using a magnetic mechanism. The present invention uses gearing to reduce the amount of input rotational force needed to be applied by the magnetic mechanism. The present invention also improves the prior art by using gear mechanisms other than planetary gear mechanisms, reducing cost and complications in installation and maintenance. Furthermore, the gearing used in the present invention is designed to remained captive and stationary within the mechanism while the rising stem component translates relative to the gears. Because the gears are in a fixed vertical position, the total footprint of the mechanism described by the present invention is reduced, allowing the mechanism to be utilized in a greater number of locations and with less inconvenience.

Additionally, existing systems, such as that described in U.S. Pat. No. 9,377,121, require physical rotation of a magnetic cartridge around a stem. However, a system does not exist that is able to magnetically actuate valves without physically rotating. In this way, the only movements that occur within the system occur within a pressure vessel and not outside of it, reducing the possibility of a spark.

Finally, existing systems only contemplate replacing the whole valve. While these systems often mechanically work, they are often financially inefficient, as removing the bonnet of the existing valve or altering the stem often voids the warranty on the system. Therefore, there is a need in the art to provide the benefits of electromagnetic valve actuation without substantially altering the stem or bonnet of the existing valve mechanism.

Referring now to the drawings in general, the illustrations are for the purpose of describing one or more preferred embodiments of the invention and are not intended to limit the invention thereto.

FIG. 1 illustrates a top sectional view of an electromagnetic control valve according to one embodiment of the present invention. In order to apply force necessary to open or close the valve, an electromagnetic actuator is utilized. The electromagnetic actuator is configured to receive and radially surround a first end of a primary shaft 10. A plurality of permanent (e.g., ferromagnetic) magnets 12 radially surround the first end of the primary shaft 10 within the electromagnetic actuator. In one embodiment, the plurality of permanent magnets 12 are directly attached (e.g., via screws, bolts, adhesive, or any other means) to the first end of the primary shaft 10. In another embodiment, the plurality of permanent magnets 12 are directly attached (e.g., via screws, bolts, adhesive, or any other means) to an inner surface of an inner housing 14, and the plurality of permanent magnets 12 are in tight, frictional engagement when the primary shaft 10 is inserted into the inner housing 14. In one embodiment, the inner housing 14 is a substantially cylindrical, hollow component with an opening in at least one side configured to receive the primary shaft 10.

At least one electromagnet (e.g., a solenoid coil) 15 is contained within an outer housing 16 and surrounds the inner housing 14. When the at least one electromagnet 15 is activated (i.e., energized by a current), the magnetic force between the at least one electromagnet 15 and the plurality of permanent magnets 12 causes the primary shaft 10 to rotate. The at least one electromagnet 15 is connected to a controller 20 by one or more wires 22, which deliver commands from the controller 20 in the form of electrical current. In one embodiment, the controller 20 is connected to at least one motor configured to automatically rotate the outer housing 16, and therefore also rotate the plurality of permanent magnets 12, relative to the inner housing 14, causing the primary shaft 10 to rotate. One of ordinary skill in the art will understand that, although the permanent magnets and electromagnets shown in FIG. 1 are depicted as separate and distinct magnetic entities, the present invention is also operable to include one or more ring magnets in place of the separate and distinct magnets for either or both the permanent magnetic element and/or the electromagnetic element. In one embodiment, the electromagnetic motor is a stator motor, a stepper motor, or the like.

Figure 2:
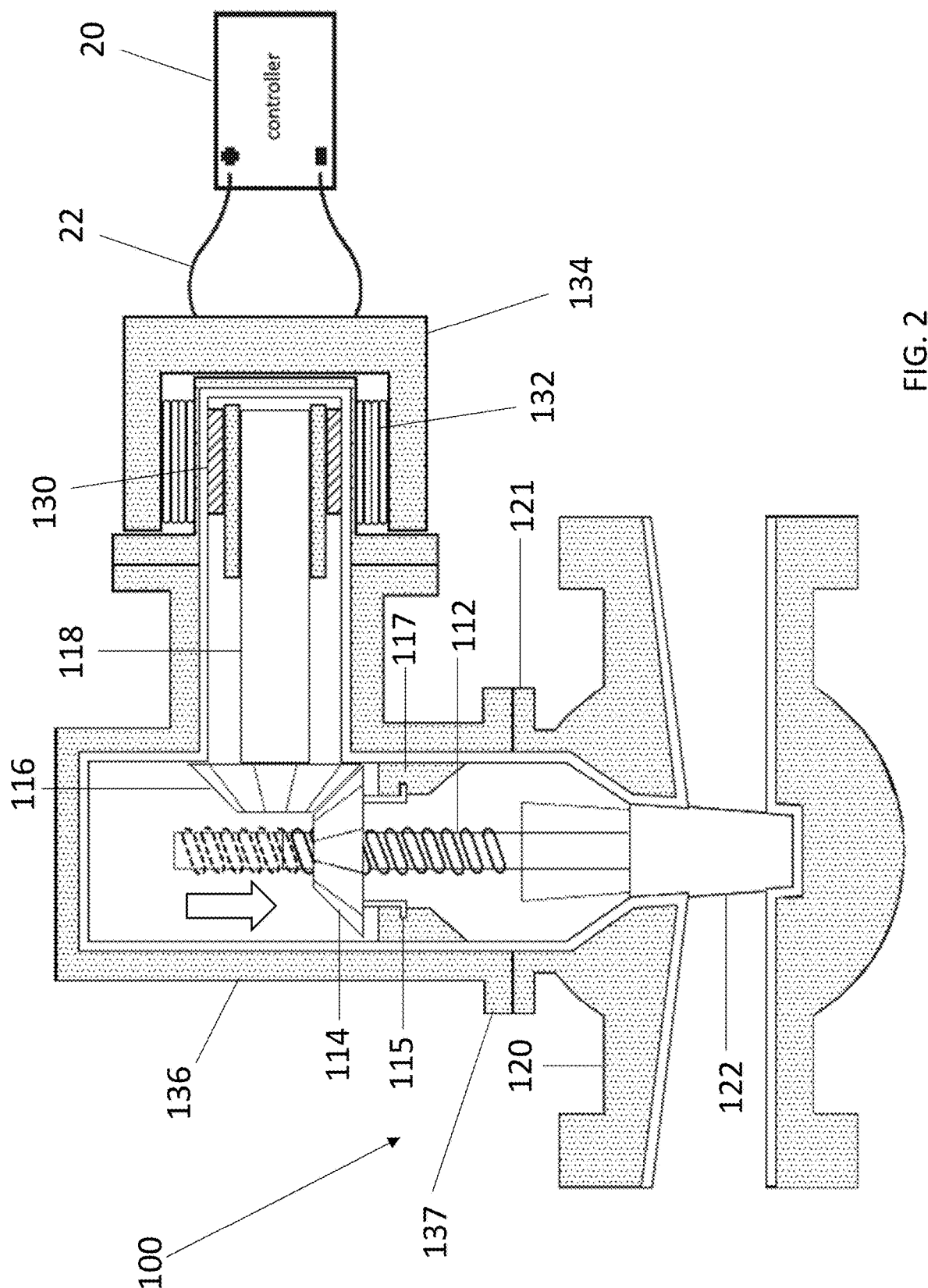
FIG. 2 illustrates a side sectional view of an electromagnetic rising stem valve utilizing two bevel gears according to one embodiment of the present invention.

FIG. 2 illustrates a side sectional view of an electromagnetic rising stem valve utilizing two bevel gears according to one embodiment of the present invention. In one embodiment, an electromagnetic rising stem valve 100 is connected to a pipe 120 transporting fluid (e.g., oil, natural gas, water, etc.). The electromagnetic rising stem valve 100 includes a stopper 122, which, in a closed position, extends into a central opening of the pipe 120, preventing fluid from flowing through the pipe 120. In an open position, the stopper 122 is withdrawn, allowing fluid to flow through the pipe 120. In one embodiment, the electromagnetic rising stem valve 100 does not use any rotating valve component, such as a ball valve or a butterfly valve.

In one embodiment, the stopper 122 is attached to a first shaft 112. In one embodiment, the first shaft 112 extends outwardly from the stopper 122 in a direction substantially orthogonal to a longitudinal central axis of the pipe 120. In one embodiment, an external surface of the first shaft 112 includes helical and/or annular threading. The first shaft 112 extends through a central bore of a first gear 114. In one embodiment, an inner surface of the central bore of the first gear 114 includes helical and/or annular threading configured to mate with the helical and/or annular threading of the first shaft 112. As the first gear 114 rotates, the first shaft 112 also rotates, causing the first shaft 112 to move upwardly or downwardly relative to the first gear 114, as the threading on the first shaft 112 articulates with the threading on the first gear 114. In one embodiment, one or more wedges 117 are attached to an inner side wall of the gear housing 136 and extend inwardly. In one embodiment, the one or more wedges 117 includes a single annular wedge surrounding the full circumference of the inner side wall of the gear housing 136. In one embodiment, the first gear 114 includes one or more prongs 115 attached to an inner side wall of a gear housing 136 in order to keep the first gear 114 in place while the first shaft 112 translates relative to the first gear 114. In one embodiment, the one or more prongs 115 include one or more legs extending approximately parallel to the axis of rotation of the first gear 114. A first end of the one or more legs is attached to an underside of the first gear 114, while at least one foot extends orthogonal outwardly from a second end of the one or more legs. By inserting the at least one foot one the one or more legs in a small crevice in the inner side wall of the gear housing 136, the first gear 114 is able to be held in place. In another embodiment, the one or more prongs 115 includes a hollow cylindrical extension extending substantially parallel to the axis of rotation of the first gear 114. A first end of the hollow cylindrical extension is attached to an underside of the first gear 114, while a ledge extends radially outwardly from a second end of the hollow cylindrical extension. The ledge is configured to fit within a small, annular indentation in the inner side wall of the gearing housing 136, thereby retaining the first gear 114 in place. Utilizing a captive gear set-up is useful, as it reduces the number of parts translating within the valve 100, and thereby reduces the potential footprint of the valve 100.

The first gear 114 is configured to intermesh with a second gear 116, such that rotation of the second gear 116 causes rotation of the first gear 114. In the embodiment shown in FIG. 2, first gear 114 and the second gear 116 are both bevel gears, allowing the gears to the positioned orthogonally to one another, as shown in FIG. 2, rather than in a parallel orientation. One of ordinary skill in the art will understand that the present invention is not limited to gears meeting at a strictly 90 degree angle orientation, and other angles are possible by changing the pitch surface and/or the pitch angle of the first gear 114 and/or the second gear 116. In one embodiment, the beveled surface of the first gear 114 is opposite the surface of the first gear 114 facing the stopper 122.

The gear housing 136 includes an adapter plate 137 configured to attach to an attachment region 121 extending outwardly from the pipe 120. In one embodiment, the adapter plate 137 includes a central bore through which the first shaft 112 extends and a rim surrounding the central bore. In one embodiment, the rim of the adapter plate 137 includes a plurality of openings configured to receive screws and/or bolts for attaching the adapter plate 137 to the attachment region 121. In one embodiment, the adapter plate 137 is integrally formed with the gear housing 136. In another embodiment, the adapter plate 137 is attached to the gear housing 136 through any attachment means known in the art, including, but not limited to, screws, bolts, ties, adhesive, welding, and other known means.

The second gear 116 is connected to a first end of a second shaft 118, extending parallel to the axis of rotation of the second gear 116. A second end of the second shaft 118 is positioned proximate to one or more permanent magnets 130 (e.g., ferromagnets). In one embodiment, the one or more permanent magnets 130 is directly attached to an outside surface of the second end of the second shaft 118 (e.g., via adhesive, nuts and bolts, screws, or any other attachment means). In another embodiment, the one or more permanent magnets 130 is directly attached to an inner surface of the gear housing 136 that surrounds the second end of the second shaft 118 (e.g., via adhesive, nuts and bolts, screws, or any other attachment means). Importantly, the gear housing 136 is a leak-free enclosure entirely surrounds the gear mechanism, including the first shaft 112, the first gear 114, the second gear 116, and the second shaft 118, with no external openings. This means that if fluid from the pipe 120 enters the valve when the stopper 122 is in an open position (or leaks through when the stopper 122 is in a closed position), then the fluid only leaks into the interior of the gear housing 136 and not outside of the system entirely, reducing risk of environmental or personal harm.

A magnetic housing 134 surrounds the section of the gear housing 136 surrounding the second end of the second shaft 118. In one embodiment, the magnetic housing 134 is a substantially cylindrical hollow component that is substantially concentric with the section of the gear housing 136. In one embodiment, an interior surface of the magnetic housing 134 is attached to one or more electromagnets 132. In one embodiment, the magnetic housing 134 and the one or more electromagnets 132 acts as the stator of the system, while the second shaft 118 and the one or more permanent magnets 118 acts as the rotor. The one or more electromagnets 132 are connected via one or more wires 22 to a controller 20, configured to deliver an electric current to the one or more electromagnets 132, enervating them so as to apply a magnetic force to the permanent magnets 130 surrounding the second shaft 118, thereby rotating the second shaft 118. When current is delivered to the one or more electromagnets 132, the one or more electromagnets 132 are configured such that a rotating magnetic field is generated, which is what causes the second shaft 118 to rotate. In one embodiment, the controller 20 is connected to one or more electric motors within the magnetic housing 134. When a signal is transmitted from the controller 20 to the electric motors, the magnetic field produced by the magnetic housing 134 is rotated, causing a magnetic force to be applied to the second shaft 118, thereby rotating the second shaft 118. Critically, in a preferred embodiment, the magnetic housing 134 itself does not rotate in this system, but remains entirely static, with the rotating magnetic field by the one or more electromagnets being sufficient to rotate the second shaft 118.

In one embodiment, the gear housing 136 is substantially formed from a non-magnetic material (e.g., a diamagnetic material) so as to not weaken the electromagnetic force through generation of unintended eddy currents in the gearing housing 136. In one embodiment, additional elements of the valve 100 are also formed from non-magnetic materials, such as the first shaft 112, the first gear 114, the second gear 116, the second shaft 118, and/or the stopper 122.

Figure 3:
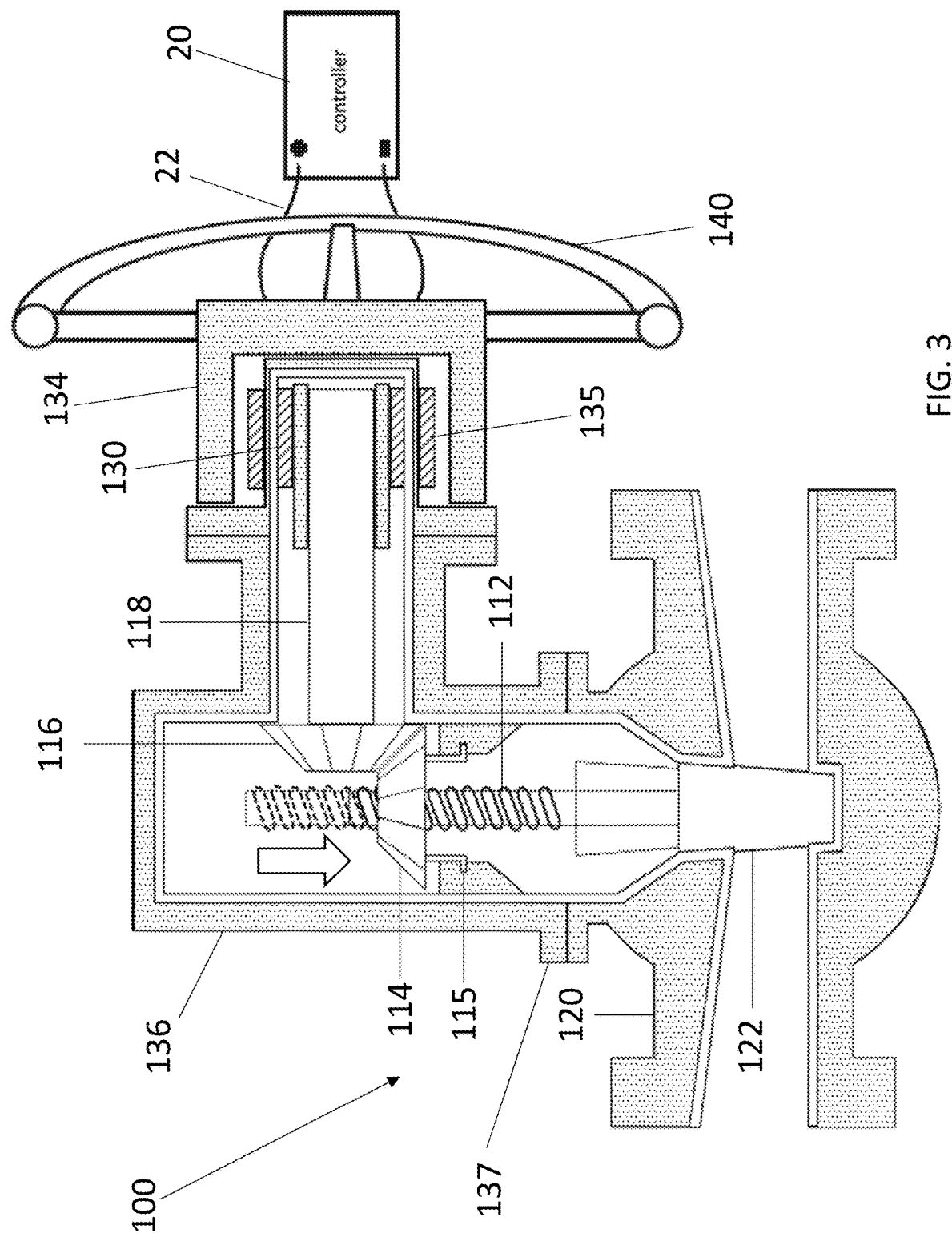
FIG. 3 illustrates a side sectional view of a magnetic rising stem valve utilizing two bevel gears and including a manual actuator according to one embodiment of the present invention.

FIG. 3 illustrates a side sectional view of a magnetic rising stem valve utilizing two bevel gears and including a manual actuator according to one embodiment of the present invention. As shown in FIG. 3, in one embodiment, the one or more electromagnets within the magnetic housing 134 are able to be supplemented or replaced with a second set of permanent magnets 135. A handle 140 extends radially outwardly from an external side wall of the magnetic housing 134, thereby rotating the second set of permanent magnets 135 relative to the permanent magnets 130 attached to the second end of the second shaft 118. This allows an electromagnetic torque to be induced in the second shaft 118 without use of electrical current. However, in one embodiment, the magnetic housing 134 still includes at least one motor connected to a controller 20 capable of automatically turning the magnetic housing 134, but without activation of any electromagnetic elements.

Figure 4:
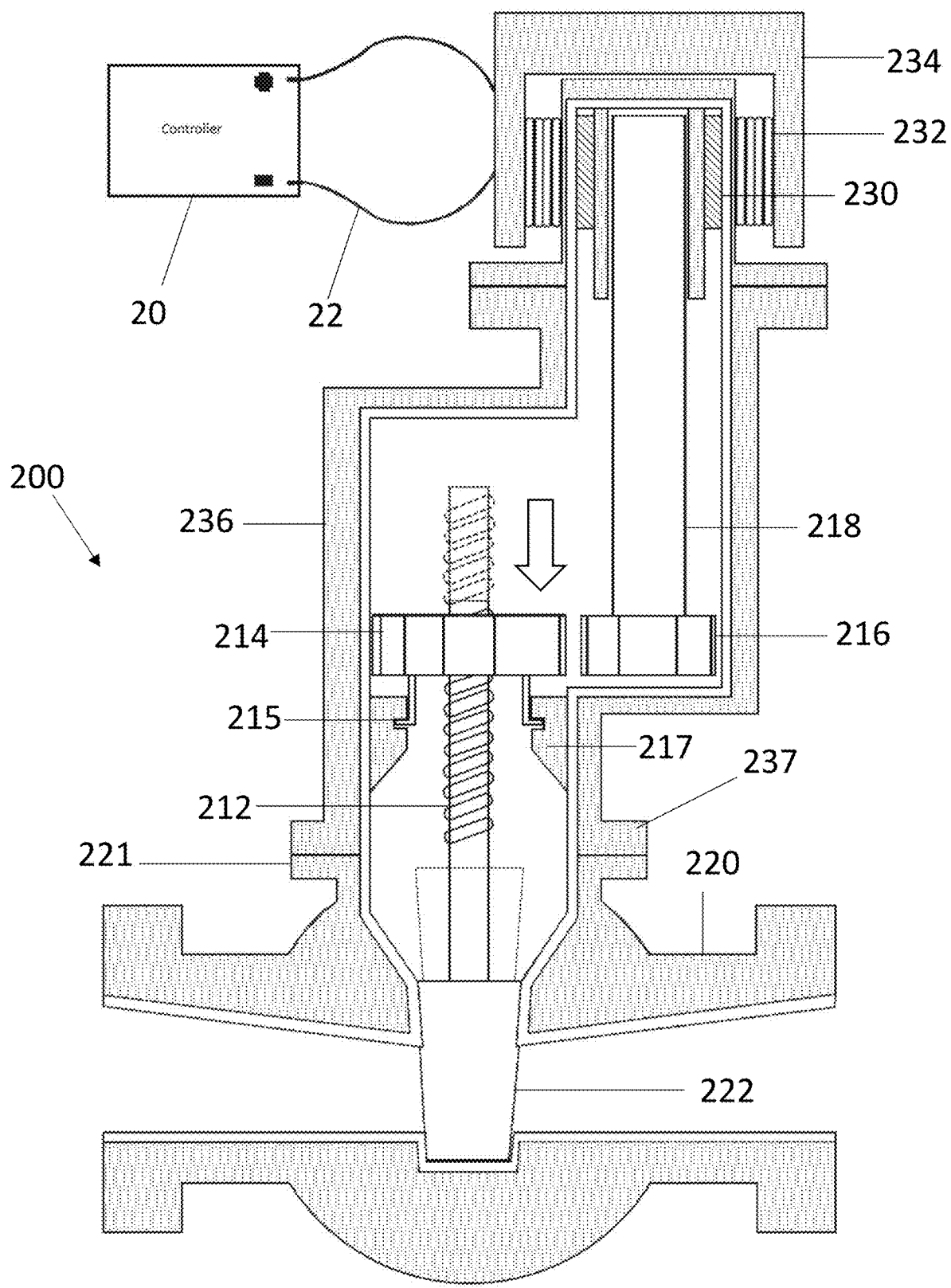
FIG. 4 illustrates a side sectional view of an electromagnetic rising stem valve utilizing a parallel shaft gear mechanism according to one embodiment of the present invention.

FIG. 4 illustrates a side sectional view of an electromagnetic rising stem valve utilizing a parallel shaft gear mechanism according to one embodiment of the present invention. In one embodiment, an electromagnetic rising stem valve 200 is connected to a pipe 220 transporting fluid (e.g., oil, natural gas, water, etc.). The electromagnetic rising stem valve 200 includes a stopper 222, which, in a closed position, extends into a central opening of the pipe 220, preventing fluid from flowing through the pipe 220. In an open position, the stopper 222 is withdrawn, allowing fluid to flow through the pipe 220.

In one embodiment, the stopper 222 is attached to a first shaft 212. In one embodiment, the first shaft 212 extends outwardly from the stopper 222 in a direction substantially orthogonal to a longitudinal central axis of the pipe 220. In one embodiment, an external surface of the first shaft 212 includes helical and/or annular threading. The first shaft 212 extends through a central bore of a first gear 214. In one embodiment, an inner surface of the central bore of the first gear 214 includes helical and/or annular threading configured to mate with the helical and/or annular threading of the first shaft 212. As the first gear 214 rotates, the first shaft 212 also rotates, causing the first shaft 212 to move upwardly or downwardly relative to the first gear 214, as the threading on the first shaft 212 articulates with the threading on the first gear 214. In one embodiment, the first gear 214 includes one or more prongs 215 attached to an inner side wall of a gear housing 236 in order to keep the first gear 214 in place while the first shaft 212 translates relative to the first gear 214. In one embodiment, the one or more prongs 215 include one or more legs extending approximately parallel to the axis of rotation of the first gear 214. A first end of the one or more legs is attached to an underside of the first gear 214, while at least one foot extends orthogonal outwardly from a second end of the one or more legs. By inserting the at least one foot one the one or more legs in a small crevice in the inner side wall of the gear housing 236, the first gear 214 is able to be held in place. In another embodiment, the one or more prongs 215 includes a hollow cylindrical extension extending substantially parallel to the axis of rotation of the first gear 214. A first end of the hollow cylindrical extension is attached to an underside of the first gear 214, while a ledge extends radially outwardly from a second end of the hollow cylindrical extension. The ledge is configured to fit within a small, annular indentation in the inner side wall of the gearing housing 236, thereby retaining the first gear 214 in place. Utilizing a captive gear set-up is useful, as it reduces the number of parts translating within the valve 200, and thereby reduces the potential footprint of the valve 200, while still providing for sufficient gear reduction to provide high torque in actuating the valve.

The first gear 214 is configured to intermesh with a second gear 216, such that rotation of the second gear 216 causes rotation of the first gear 214. In one embodiment, as shown in FIG. 4, the first gear 214 and the second gear 216 are approximately parallel and substantially coplanar, such that each gear rotates in approximately the same direction. In one embodiment, the first gear 214 is larger than the second gear 216, but one of ordinary skill in the art will understand that the invention described herein is not intended to be limited to such an embodiment.

The second gear 216 is connected to a first end of a second shaft 218, extending parallel to the axis of rotation of the second gear 216. In the embodiment shown in FIG. 4, the second shaft 218 is substantially parallel to the first shaft 212. A second end of the second shaft 218 is positioned proximate to one or more permanent magnets 230 (e.g., ferromagnets). In one embodiment, the one or more permanent magnets 230 is directly attached to an outside surface of the second end of the second shaft 218 (e.g., via adhesive, nuts and bolts, screws, or any other attachment means). In another embodiment, the one or more permanent magnets 230 is directly attached to an inner surface of the gear housing 236 that surrounds the second end of the second shaft 218 (e.g., via adhesive, nuts and bolts, screws, or any other attachment means). Importantly, the gear housing 236 entirely surrounds the gear mechanism, including the first shaft 212, the first gear 214, the second gear 216, and the second shaft 218, with no external openings. This means that if fluid from the pipe 220 enters the valve when the stopper 222 is in an open position (or leaks through when the stopper 222 is in a closed position), then the fluid only leaks into the interior of the gear housing 236 and not outside of the system entirely, reducing risk of environmental or personal harm.

The gear housing 236 includes an adapter plate 237 configured to attach to an attachment region 221 extending outwardly from the pipe 220. In one embodiment, the adapter plate 237 includes a central bore through which the first shaft 212 extends and a rim surrounding the central bore. In one embodiment, the rim of the adapter plate 237 includes a plurality of openings configured to receive screws and/or bolts for attaching the adapter plate 237 to the attachment region 221. In one embodiment, the adapter plate 237 is integrally formed with the gear housing 236. In another embodiment, the adapter plate 237 is attached to the gear housing 236 through any attachment means known in the art, including, but not limited to, screws, bolts, ties, adhesive, welding, and other known means.

A magnetic housing 234 surrounds the section of the gear housing 236 surrounding the second end of the second shaft 218. In one embodiment, the magnetic housing 234 is a substantially cylindrical hollow component that is substantially concentric with the section of the gear housing 236. In one embodiment, an interior surface of the magnetic housing 234 is attached to one or more electromagnets 232. In one embodiment, the magnetic housing 234 and the one or more electromagnets 232 acts as the stator of the system, while the second shaft 218 and the one or more permanent magnets 118 acts as the rotor. The one or more electromagnets 232 are connected via one or more wires 22 to a controller 20, configured to deliver an electric current to the one or more electromagnets 232, enervating them so as to apply a magnetic force to the permanent magnets 230 surrounding the second shaft 218, thereby rotating the second shaft 218. In one embodiment, when current is delivered to the one or more electromagnets 232, the one or more electromagnets 232 are configured such that a rotating magnetic field is generated, which is what causes the second shaft 218 to rotate. In one embodiment, the controller 20 is connected to one or more electric motors within the magnetic housing 234. When a signal is transmitted from the controller 20 to the electric motors, the magnetic field produced by the magnetic housing 234 is rotated, causing a magnetic force to be applied to the second shaft 218, thereby rotating the second shaft 218. Critically, in one embodiment, the magnetic housing 234 itself does not rotate, allowing for fewer moving parts in the system and a simplified method of operation.

Figure 5:
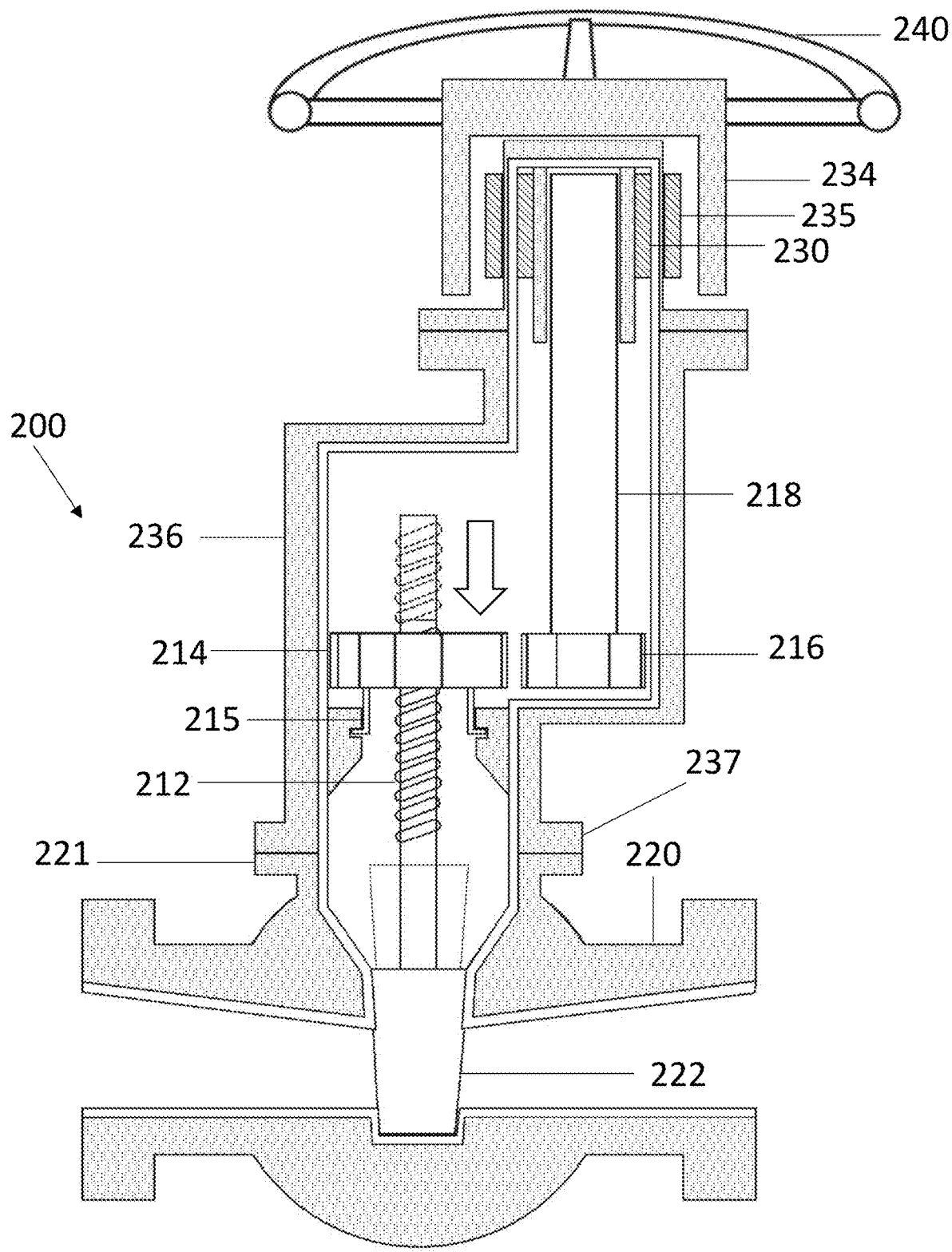
FIG. 5 illustrates a side sectional view of a magnetic rising stem valve utilizing a parallel shaft gear mechanism and including a manual actuator according to one embodiment of the present invention.

FIG. 5 illustrates a side sectional view of a magnetic rising stem valve utilizing a parallel shaft gear mechanism and including a manual actuator according to one embodiment of the present invention. As shown in FIG. 5, in one embodiment, the one or more electromagnets within the magnetic housing 234 are able to be supplemented or replaced with a second set of permanent magnets 235. A handle 240 extends radially outwardly from an external side wall of the magnetic housing 234, thereby rotating the second set of permanent magnets 235 relative to the permanent magnets 230 attached to the second end of the second shaft 218. This allows an electromagnetic torque to be induced in the second shaft 218 without use of electrical current. However, in one embodiment, the magnetic housing 234 still includes at least one motor connected to a controller 20 capable of automatically turning the magnetic housing 234, but without activation of any electromagnetic elements.

In one embodiment, the gear housing 236 is substantially formed from a non-magnetic material (e.g., a diamagnetic material) so as to not weaken the electromagnetic force through generation of unintended eddy currents in the gearing housing 236. In one embodiment, additional elements of the valve 200 are also formed from non-magnetic materials, such as the first shaft 212, the first gear 214, the second gear 216, the second shaft 218, and/or the stopper 222.

Figure 6:
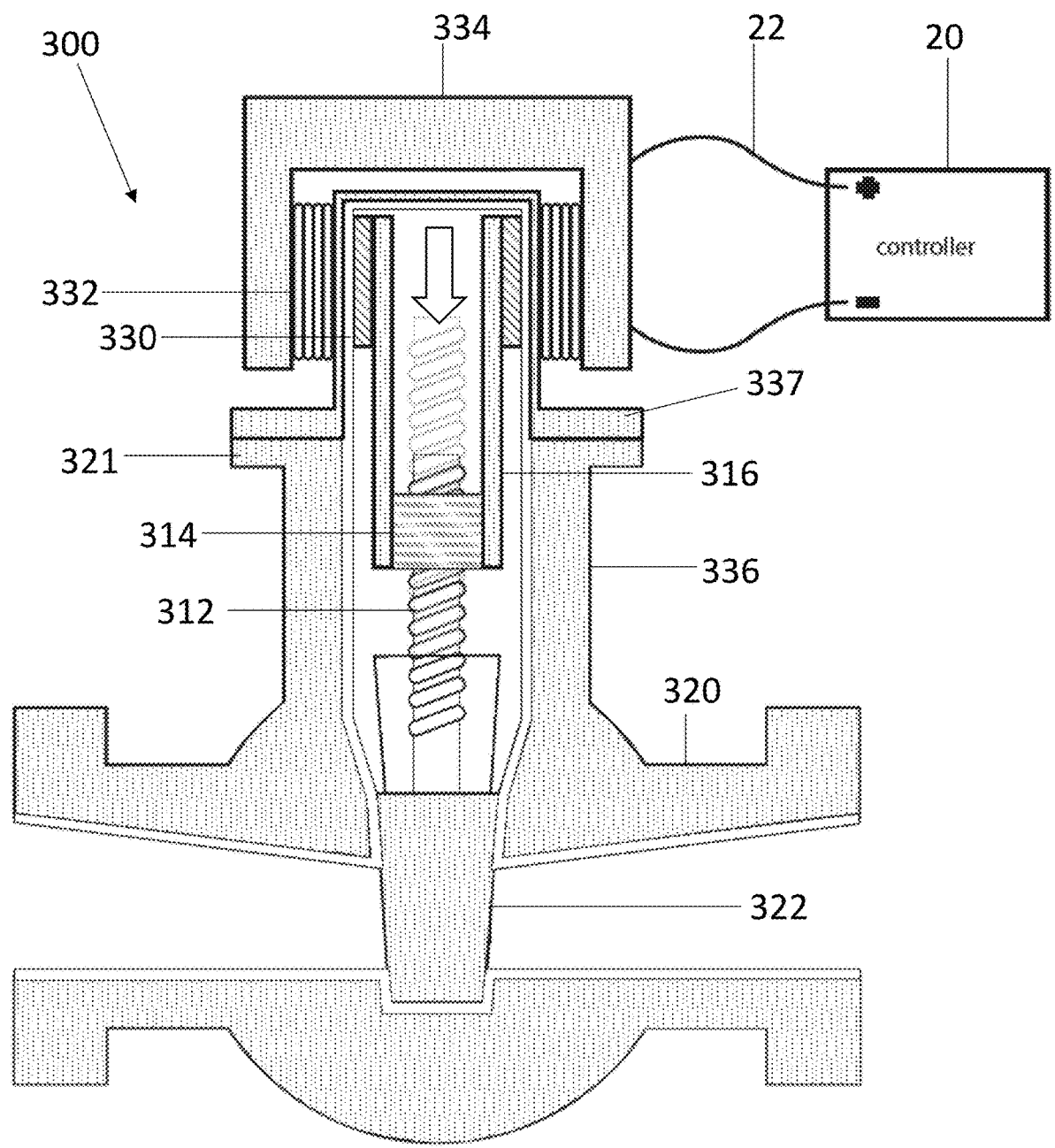
FIG. 6 illustrates a side sectional view of an electromagnetic rising stem valve utilizing a cylindrical rotation mechanism according to one embodiment of the present invention.

FIG. 6 illustrates a side sectional view of an electromagnetic rising stem valve utilizing a cylindrical rotation mechanism according to one embodiment of the present invention. A version of the electromagnetic rising stem valve 300 not using any gears is shown in FIG. 6. In one embodiment, an electromagnetic rising stem valve 300 is connected to a pipe 320 transporting fluid (e.g., oil, natural gas, water, etc.). The electromagnetic rising stem valve 300 includes a stopper 322, which, in a closed position, extends into a central opening of the pipe 320, preventing fluid from flowing through the pipe 320. In an open position, the stopper 322 is withdrawn, allowing fluid to flow through the pipe 320.

In one embodiment, the stopper 322 is attached to a shaft 312. In one embodiment, the shaft 312 extends outwardly from the stopper 322 in a direction substantially orthogonal to a longitudinal central axis of the pipe 320. In one embodiment, an external surface of the shaft 312 includes helical and/or annular threading. The shaft 312 extends through a central bore of an inner cylindrical component 314. In one embodiment, an inner surface of the central bore of the inner cylindrical component 314 includes helical and/or annular threading configured to mate with the helical and/or annular threading of the shaft 312. As the inner cylindrical component 314, the first shaft 312 also rotates, causing the shaft 312 to move upwardly or downwardly relative to the inner cylindrical component 314, as the threading on the shaft 312 articulates with the threading on the inner cylindrical component 314. The inner cylindrical component 314 is surrounded by an outer cylindrical component 316.

A magnetic housing 334 surrounds the section of the gear housing 336 surrounding a second end of the outer cylindrical component 316. In one embodiment, the magnetic housing 334 is a substantially cylindrical hollow component that is substantially concentric with the section of the gear housing 336. In one embodiment, an interior surface of the magnetic housing 334 is attached to one or more electromagnets 332. In one embodiment, the magnetic housing 334 and the one or more electromagnets 332 acts as the stator of the system, while the outer cylindrical component 316 and the plurality of permanent magnets 330 serve as the rotor. In another embodiment, both the magnetic housing 334 and the outer cylindrical component 316 act as rotating components. The one or more electromagnets 332 are connected via one or more wires 22 to a controller 20, configured to deliver an electric current to the one or more electromagnets 332, enervating them so as to apply a magnetic force to the permanent magnets 330 surrounding the outer cylindrical component 316, thereby rotating the outer cylindrical component 316. In one embodiment, when current is delivered to the one or more electromagnets 332, the one or more electromagnets 332 are configured such that a rotating magnetic field is generated, which is what causes the outer cylindrical component 316 to rotate. In one embodiment, the controller 20 is connected to one or more electric motors within the magnetic housing 334. When a signal is transmitted from the controller 20 to the electric motors, the magnetic field produced by the magnetic housing 334 is rotated, causing a magnetic force to be applied to the outer cylindrical component 316, thereby rotating the outer cylindrical component 316. Critically, the magnetic housing 334 itself is not rotated, with the rotating magnetic field produced by the controller running current through the one or more electromagnets 332 sufficient to rotate the outer cylindrical component 316.

The gear housing 336 includes an adapter plate 337 configured to attach to an attachment region 321 extending outwardly from the pipe 320. In one embodiment, the adapter plate 337 includes a central bore through which the first shaft 312 extends and a rim surrounding the central bore. In one embodiment, the rim of the adapter plate 337 includes a plurality of openings configured to receive screws and/or bolts for attaching the adapter plate 337 to the attachment region 321. In one embodiment, the adapter plate 337 is integrally formed with the gear housing 336. In another embodiment, the adapter plate 337 is attached to the gear housing 336 through any attachment means known in the art, including, but not limited to, screws, bolts, ties, adhesive, welding, and other known means.

One of ordinary skill in the art will understand that, in one embodiment, the one or more electromagnets 332 are able to be replaced by a second set of one or more permanent magnets external to the adapter plate 337, with a manual actuator added, similar to the mechanisms shown in FIGS. 3 and 5.

Figure 7:
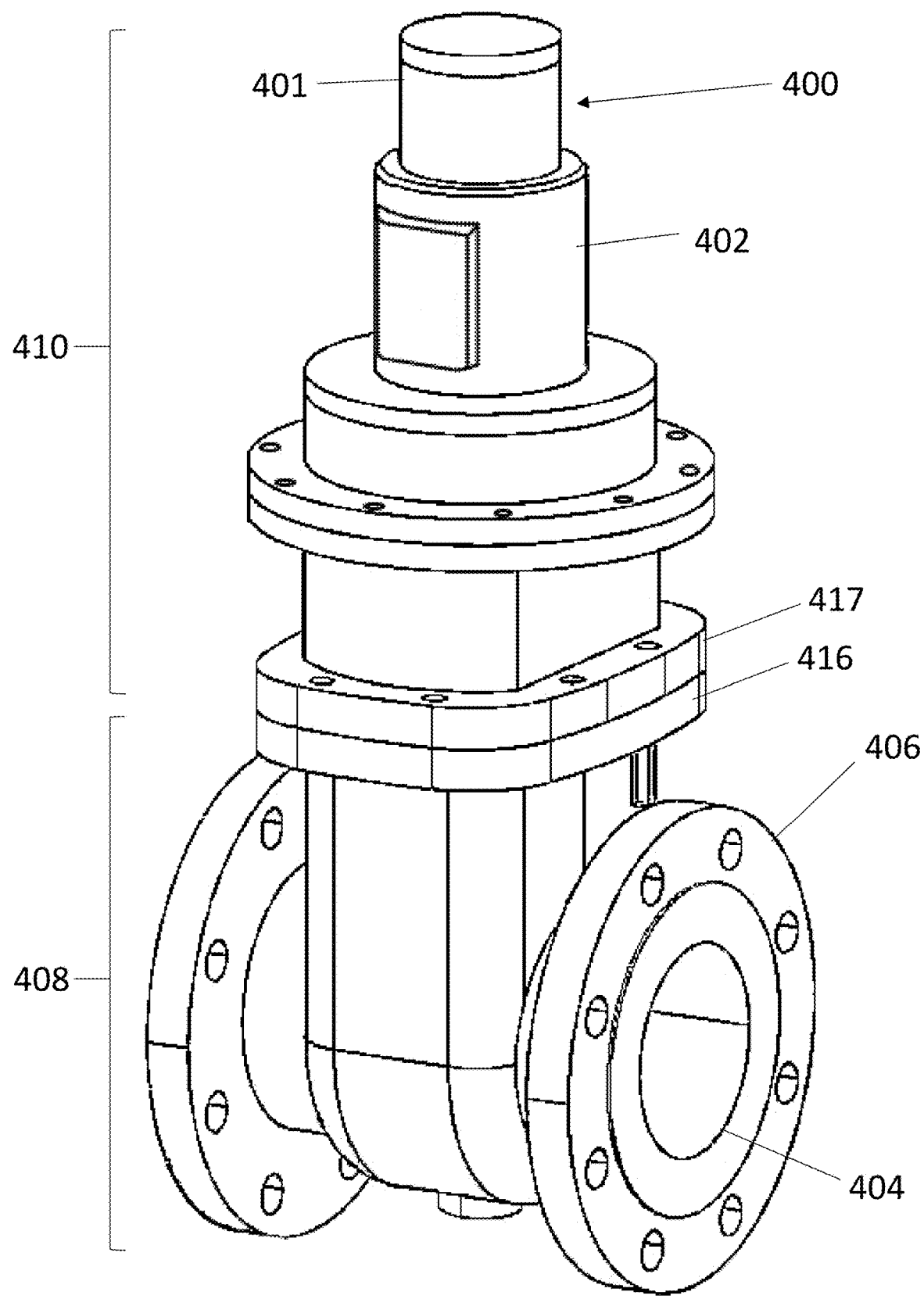
FIG. 7 illustrates a perspective view of a retrofit electromagnetic rising stem valve according to one embodiment of the present invention.
Figure 8:
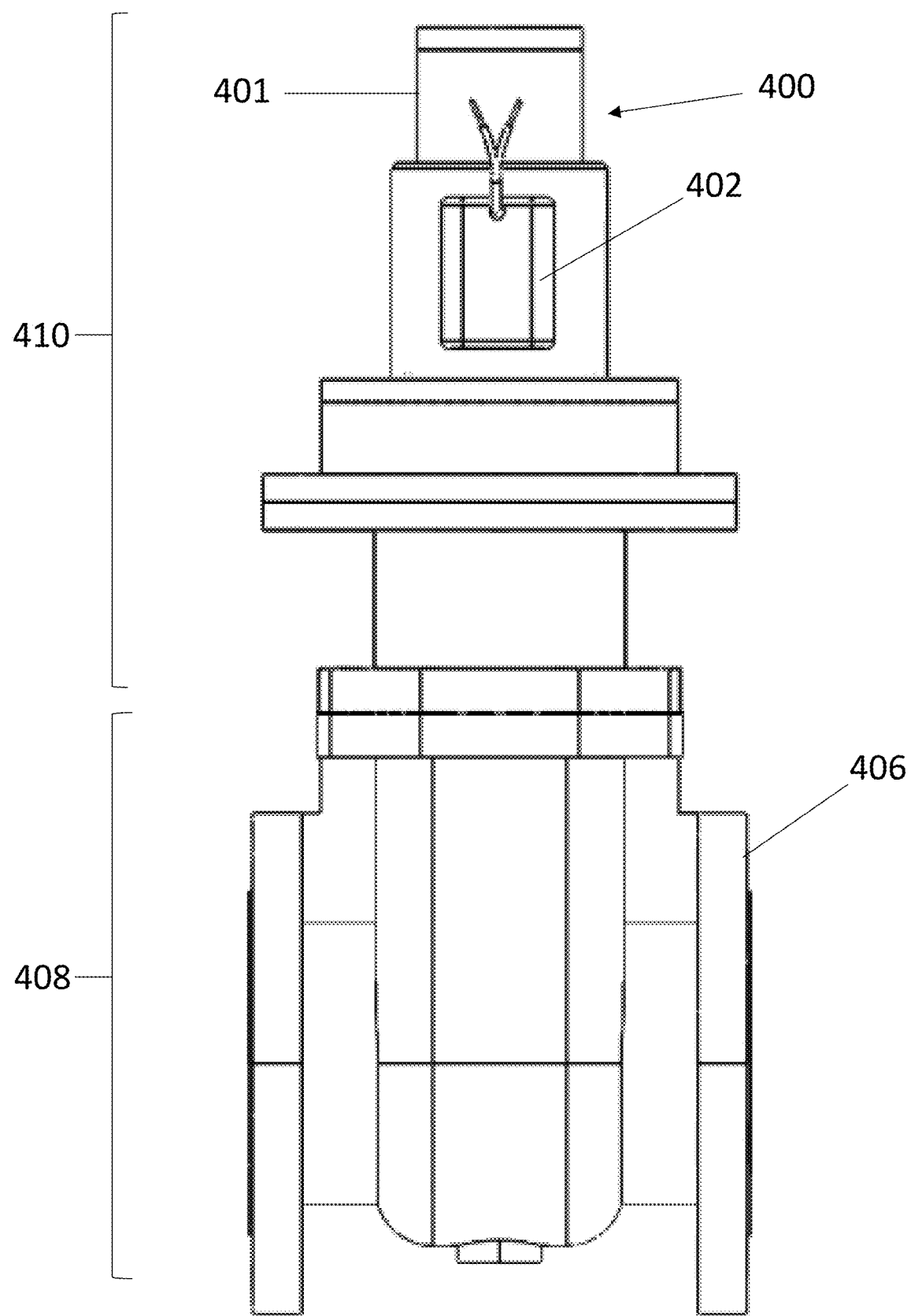
FIG. 8 illustrates a front view of the retrofit electromagnetic rising stem valve of FIG. 7.
Figure 9:
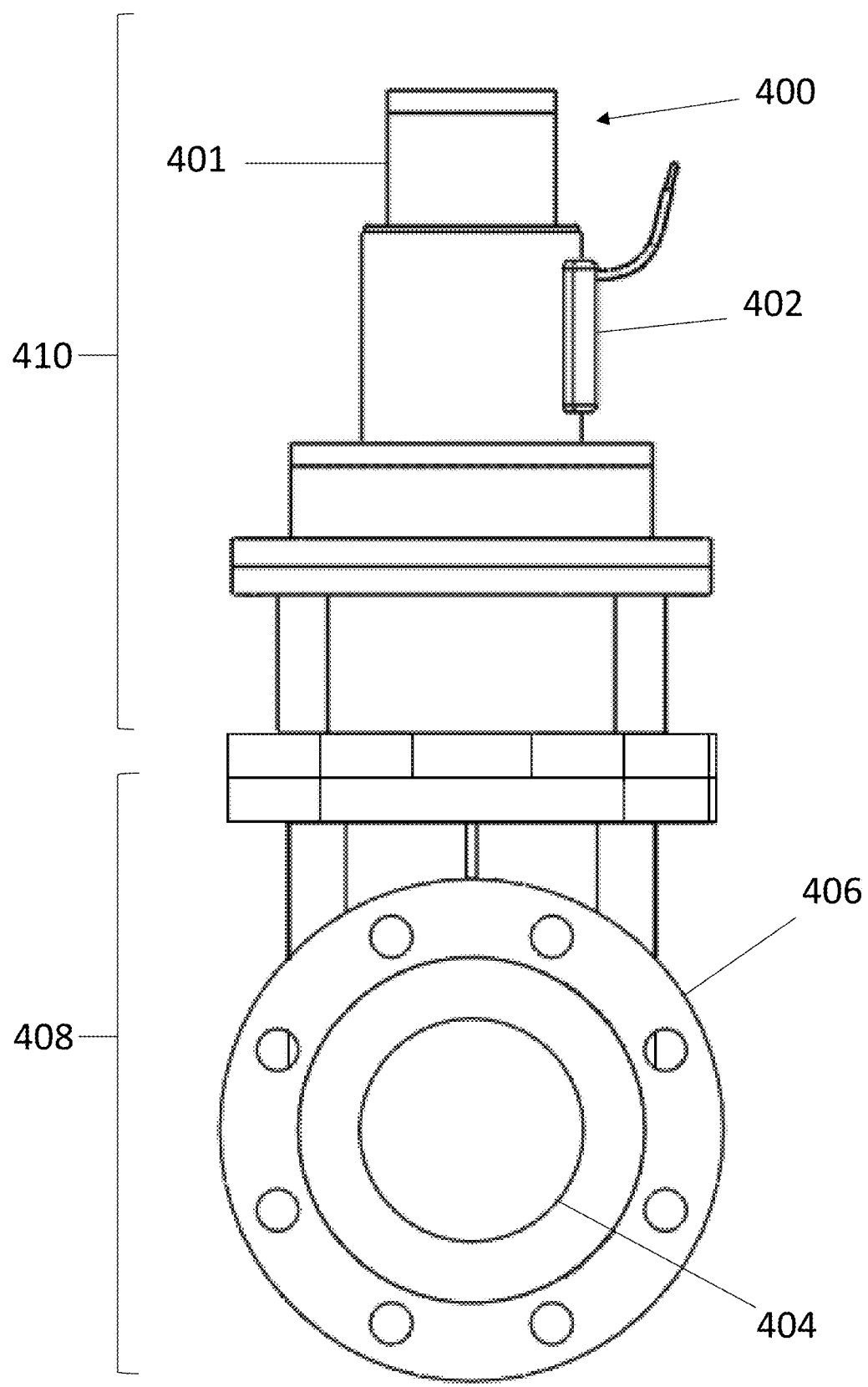
FIG. 9 illustrates a side view of the retrofit electromagnetic rising stem valve of FIG. 7.

FIGS. 7-9 illustrate external views of a retrofit electromagnetic rising stem valve according to one embodiment of the present invention. Importantly, in one embodiment, the present invention is able to be retrofitted around an existing valve mechanism, without dismantling the valve mechanism. Retrofit is useful, as it allows for lower cost improvements to existing valves. Furthermore, retrofit is often a convenient option for highly risk averse pipeline operators who worry wholesale replacements of the valve could lead to more leaks.

A pipe 406 includes an inner lumen 404 able to be blocked by an existing stem valve mechanism 408. The existing stem valve mechanism 408, more specifically the bonnet of the existing stem valve mechanism 408, commonly includes a top plate 416 through which the stem extends. While the existing stem valve mechanism 408 commonly includes a hand crank attached to the top of a stem, this hand crank tends to be easily removable without breaking the seal of the existing stem valve mechanism 408. Removing the hand crank helps to allow a new valve section 410 to be fitted around the existing stem. The new valve section 410 is attached to and layered atop the existing stem valve mechanism 408 as shown in FIGS. 7-9. The new valve section 410 includes a bottom plate 417 configured to attach to the top plate 416 of the existing stem valve mechanism 408. One of ordinary skill in the art will understand that methods by which the bottom plate 417 and the top plate 416 attach are able to vary and include, but are not limited to, screws, nuts and bolts, welding, adhesive, latches, and/or other mechanisms. Combined, the new valve section 410 and the existing stem valve mechanism 408 form a single new valve 400.

An external cartridge 401 rises upwardly from the bottom plate 417. At least a portion of the stem 401 is surrounded by an electromagnetic actuator 402, which includes at least one electromagnetic coil configured to apply a magnetic force to components within the new valve section 410, engaging or disengaging the valve mechanism by causing the stem to rise or fall. Because the electromagnetic actuator 402 is activated outside of the external cartridge, in a preferred embodiment, the external cartridge 401 and other external components of the new valve section 410 are formed primarily from non-ferromagnetic materials (e.g., polymers, non-ferromagnetic metal, etc.).

Figure 10:
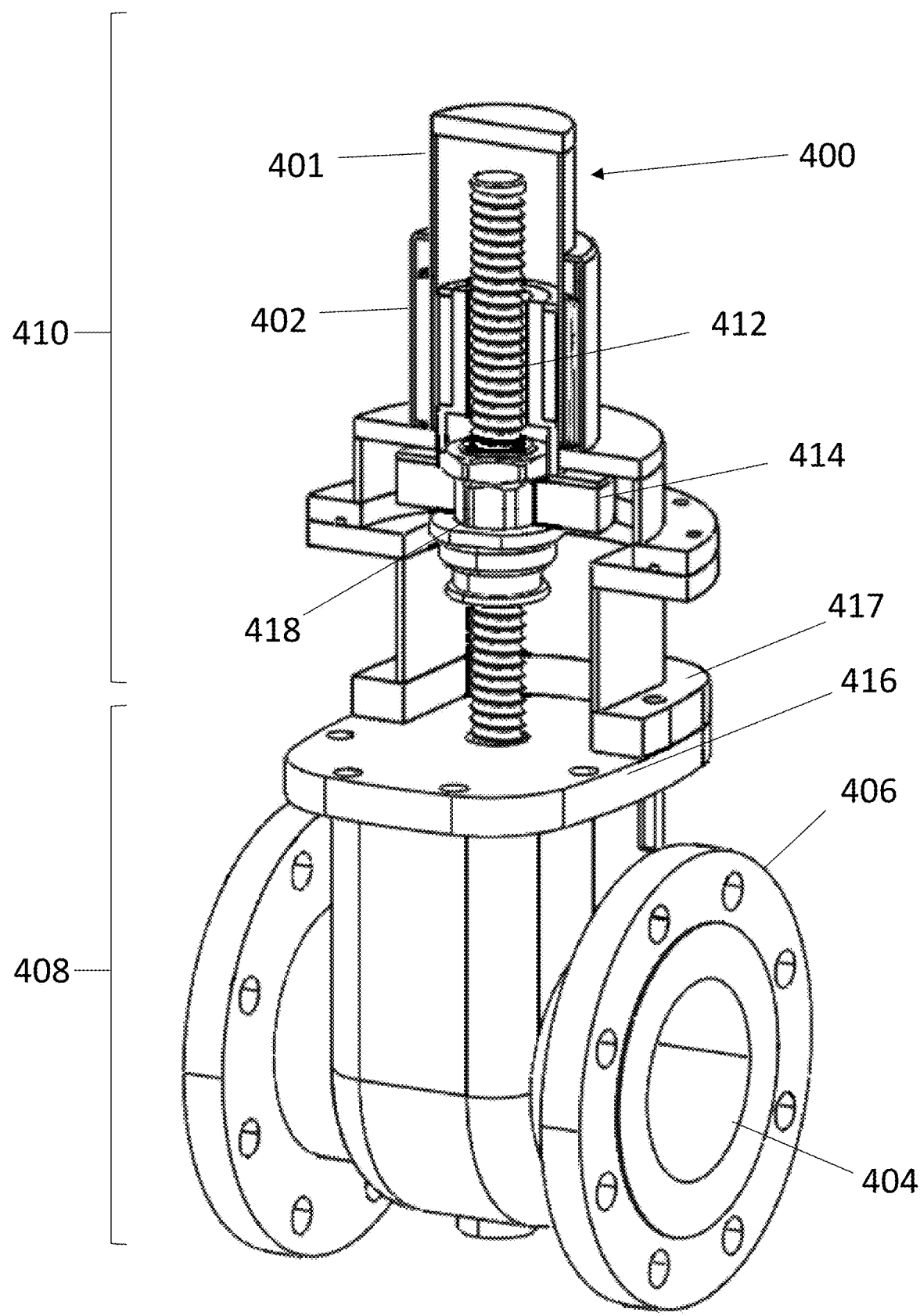
FIG. 10 illustrates a sectional view of a retrofit electromagnetic rising stem valve according to one embodiment of the present invention.

FIG. 10 illustrates a sectional view of a retrofit electromagnetic rising stem valve according to one embodiment of the present invention. The stem 412 rises through the top plate 416 of the existing stem valve mechanism 408.

Because the stems 412 of existing stem valve mechanisms 408 are typically designed without expectation of a casing surrounding the stem, an existing tight seal is expected between the stem 412 and the surrounding portion of the top plate 416. The new valve section 410 includes a ring 418 tightly fitted around a portion of the stem 412 and rotationally coupled to the stem 412, such that rotation of the ring 418 causes vertical movement of the stem 412. The stopper is keyed and the ring 418 is retained, unable to move vertically, such that only the ring 418 rotates, while the stem 412 and stopper only move upwardly and downwardly without rotating. In one embodiment, one or more wings 414 extend outwardly from the ring 418. In one embodiment, the one or more wings 414 are formed from a ferromagnetic material such that the magnetic force induced by activation of the electromagnetic actuator 402 acts on the one or more wings 414, causing the ring 418, and therefore the stem 412, to turn. In another embodiment, the one or more wings 414 are not ferromagnetic, but are tightly coupled with a ferromagnetic component surrounding the stem 412 that moves upwardly or downwardly due to magnetically-actuated rotation of the ring 418 Therefore, the electromagnetic actuator 402 is capable of either directly or indirectly rotating the ring 418, and therefore move the stem 412. Movement of the stem 412 causes the valve mechanism to block or unblock the lumen 404 of the pipe 406 depending on the direction of rotation of the ring 418.

Figure 11:
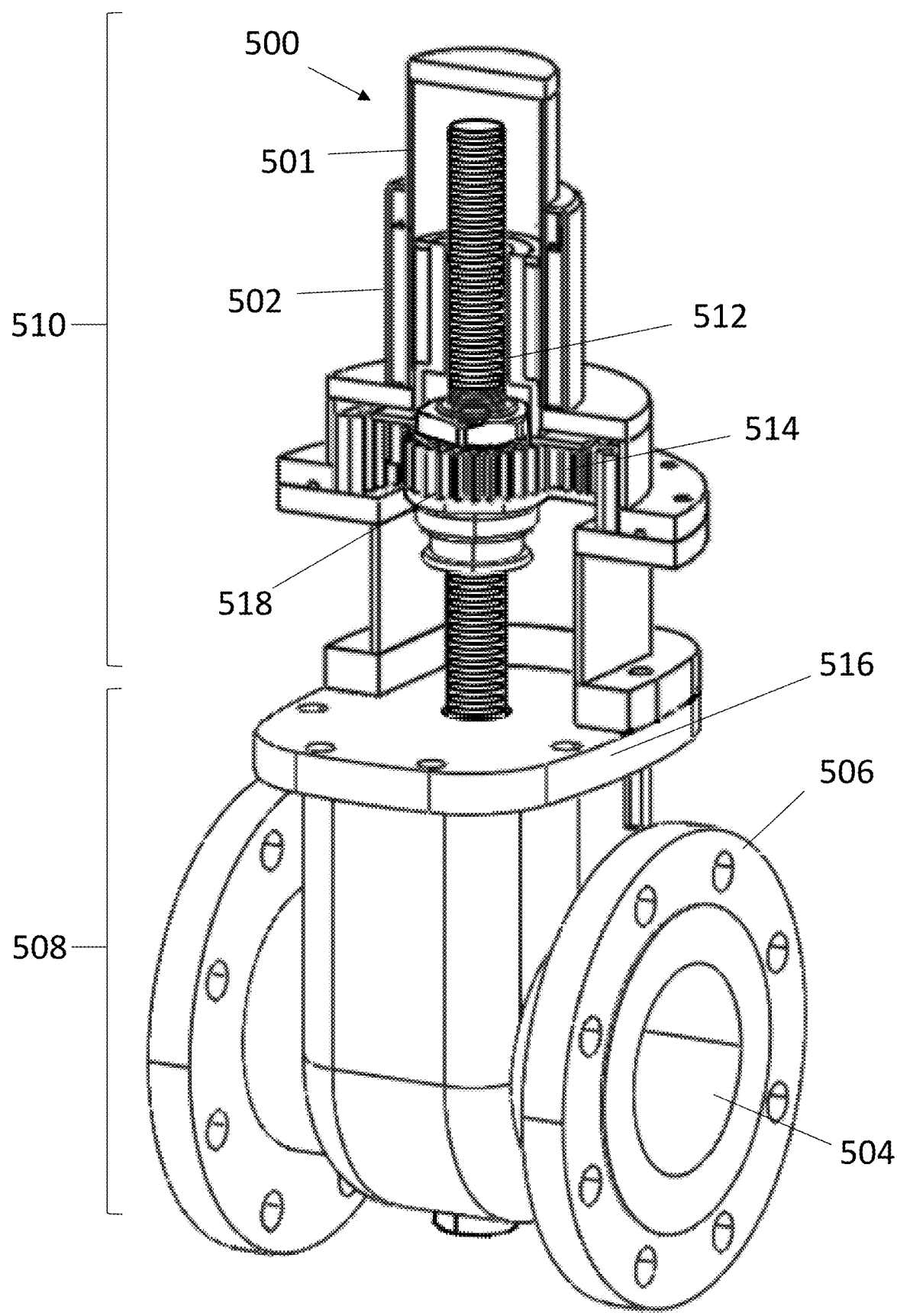
FIG. 11 illustrates a sectional view of a retrofit electromagnetic rising stem valve according to one embodiment of the present invention.
Figure 12:
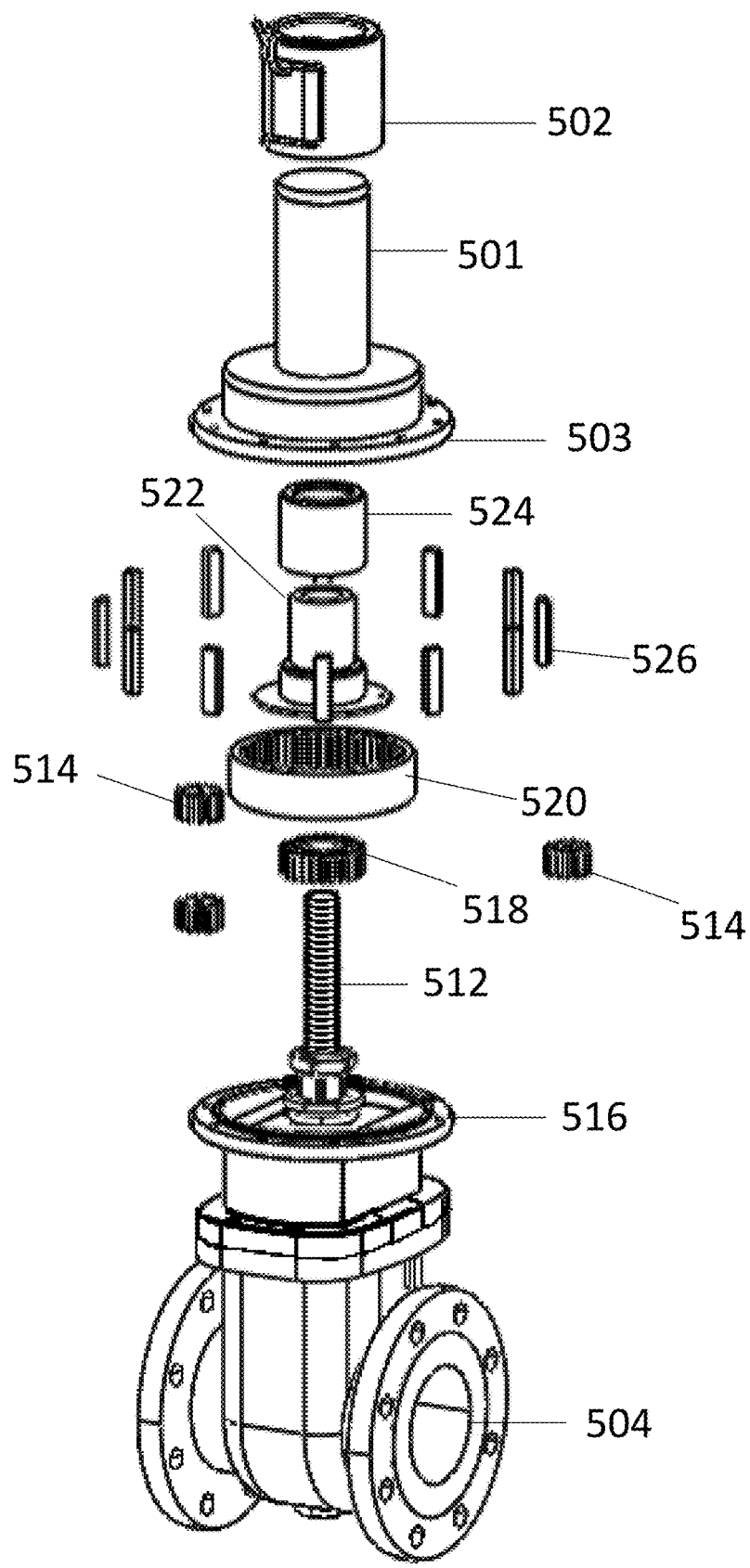
FIG. 12 illustrates an exploded view of a retrofit electromagnetic rising stem valve according to one embodiment of the present invention.
Figure 13A:
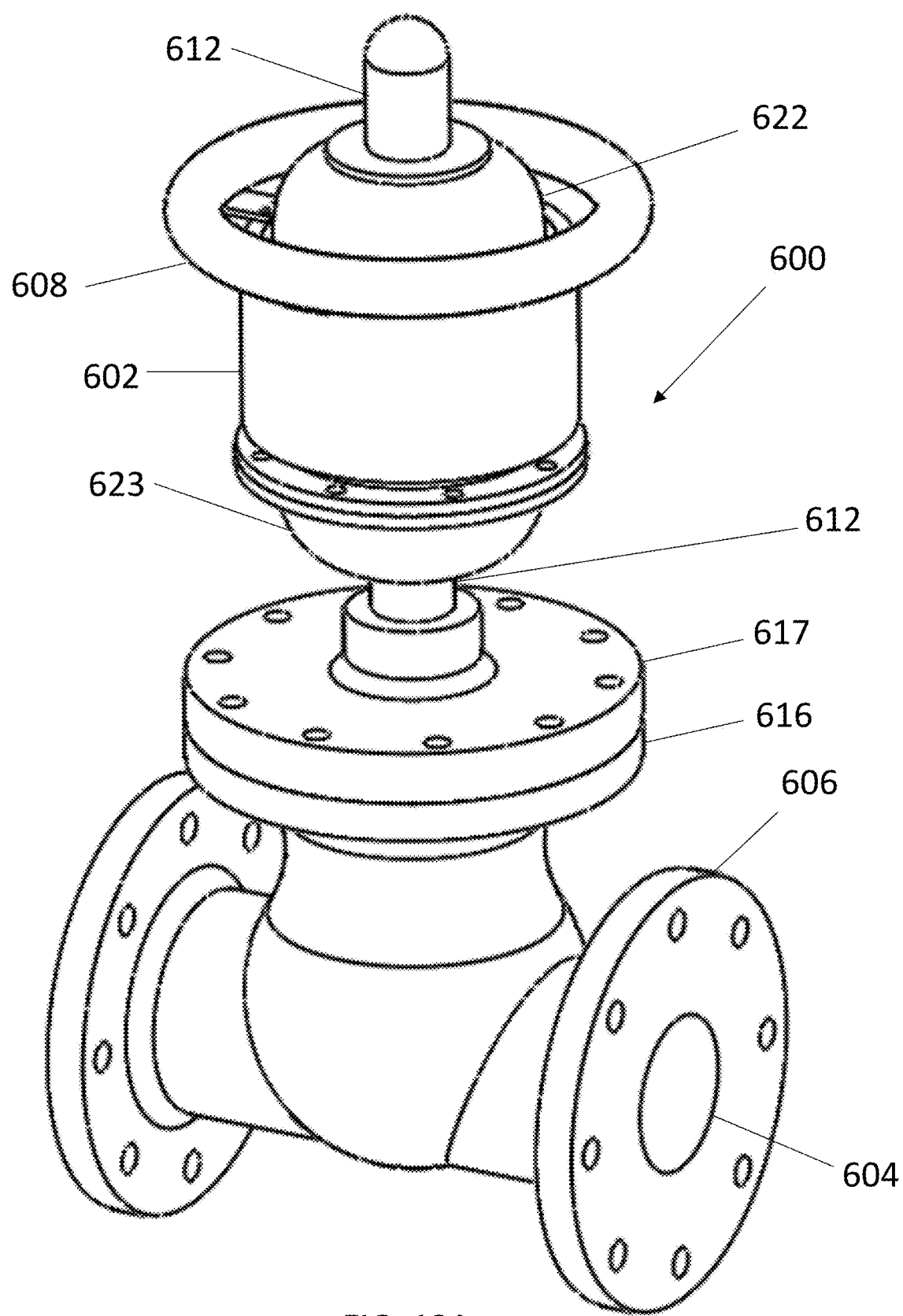
FIG. 13A illustrates a perspective view of a balloon retrofit magnetic rising stem valve with a manual hand crank according to one embodiment of the present invention.
Figure 13B:
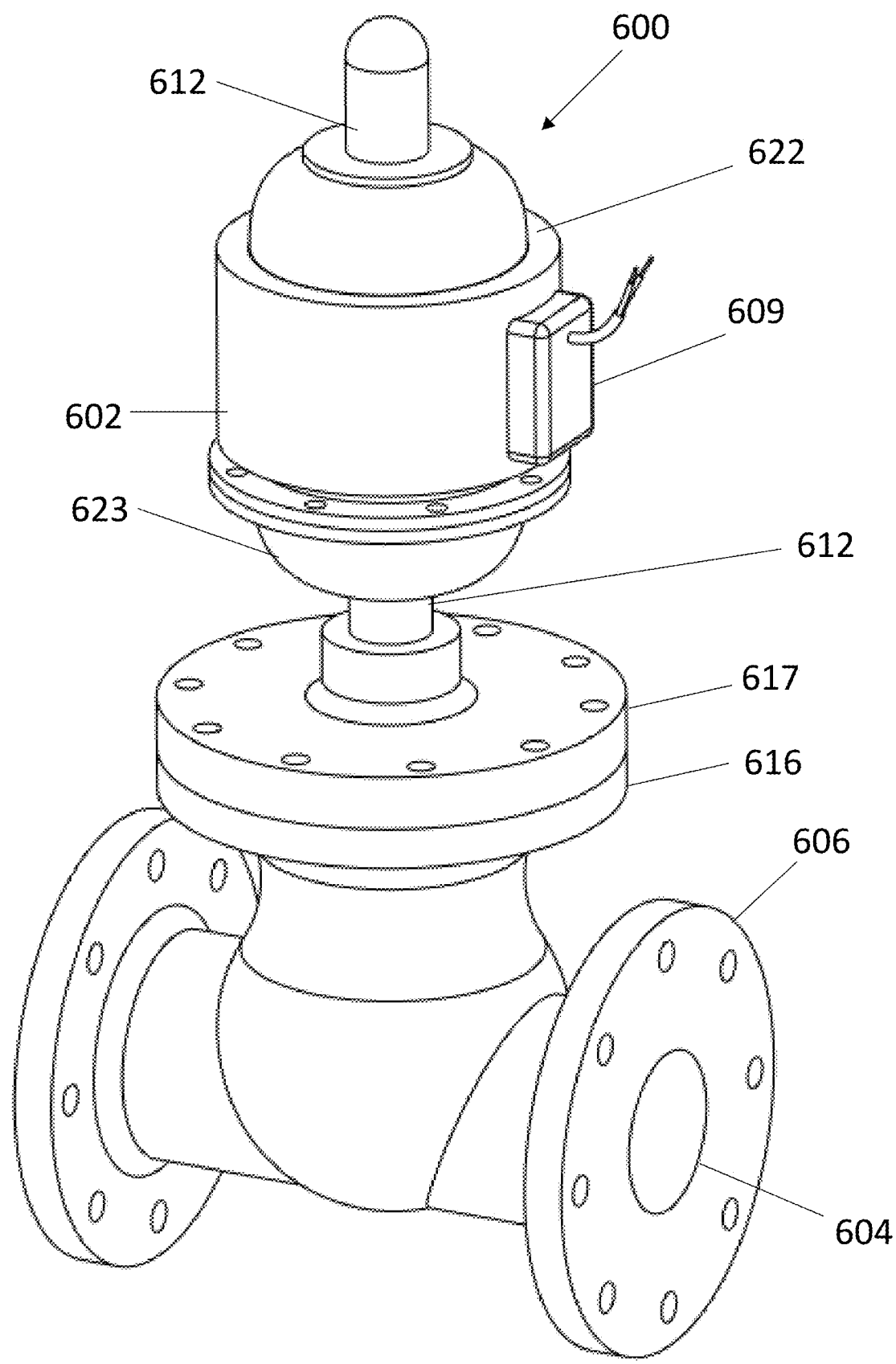
FIG. 13B illustrates a perspective view of a balloon retrofit magnetic rising stem valve with an electronic drive mechanism according to one embodiment of the present invention.
Figure 14:
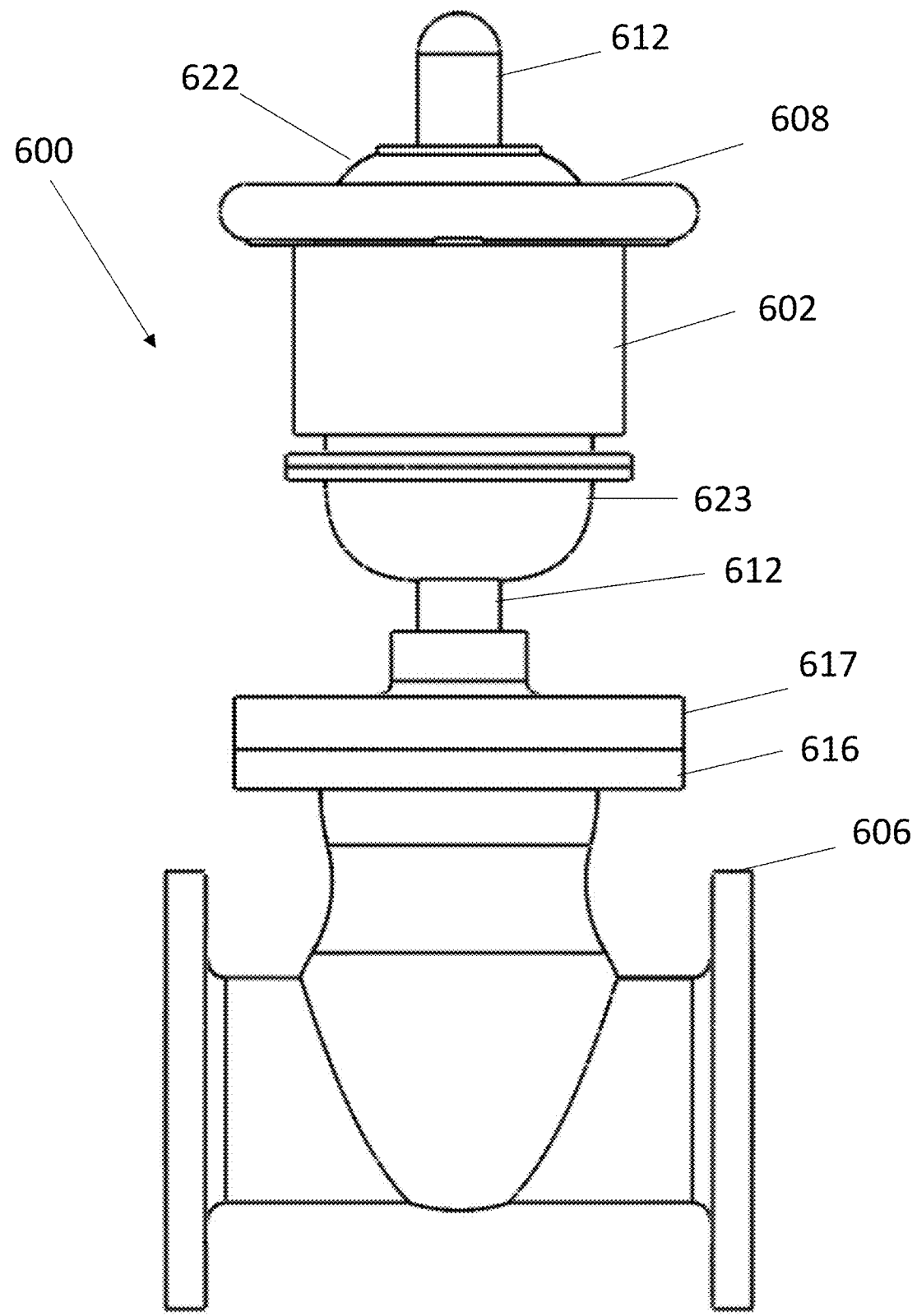
FIG. 14 illustrates a front view of a balloon retrofit magnetic rising stem valve according to one embodiment of the present invention.
Figure 15:
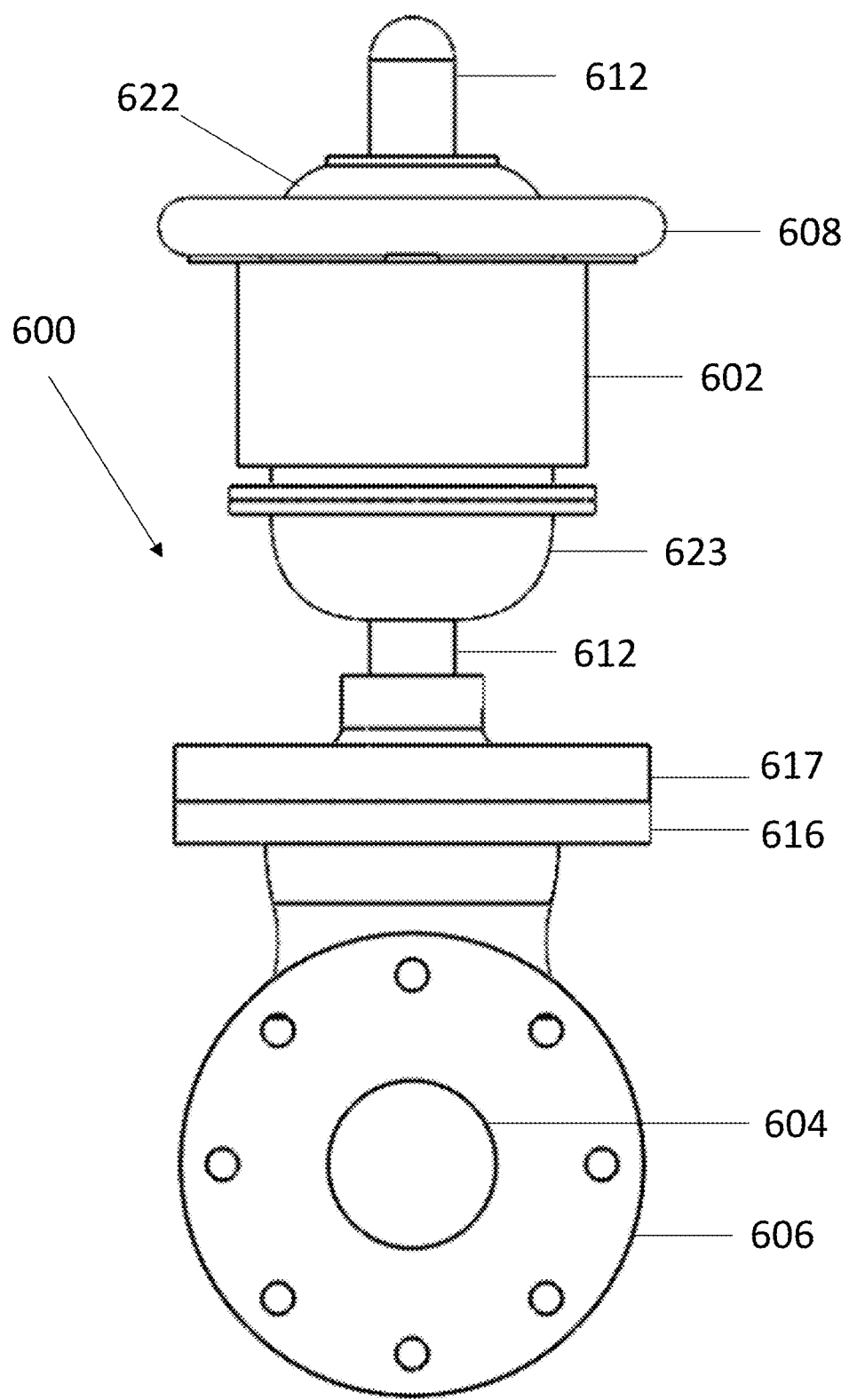
FIG. 15 illustrates a side view of a balloon retrofit magnetic rising stem valve according to one embodiment of the present invention.

FIGS. 11-12 illustrate a retrofit electromagnetic rising stem valve including a planetary gear mechanism according to one embodiment of the present invention. A pipe 506 includes a lumen 504 through which fluid flows. The pipe 506 has previously been fitted with an existing stem valve mechanism 508, including a stem 512 rising through a top plate 516, where the interface between the stem 512 and the top plate 516 is tightly sealed to prevent fluid leakage. While the existing stem valve mechanism 508 previously included a hand crank mechanism to turn the stem 512 (and thereby block or unblock the valve), the hand crank has been removed in favor of a new actuation system 510. The new actuation system 510 includes an enclosure configured to fit fully around the existing stem 512. The enclosure includes a base plate 503 configured to attach (e.g., via nut and bolts, screw, adhesive, welding, etc.) to the top plate of the existing stem valve mechanism 508. An elongate stem enclosure 501 extends upwardly from the base plate 503 and is configured to fully enclose the stem 512. In one embodiment, the elongate stem enclosure 501 is a substantially cylindrical extension, but one of ordinary skill in the art will understand that the elongate stem enclosure 501 is able to take any shape. An electromagnetic actuator 502, including one or more electromagnets and electrically coupled with at least one activation circuit, fits around and frictionally engages with an outer surface of the elongate stem enclosure 501.

Within the elongate stem enclosure 501, a sealing ring 524 is a hollow cylinder that frictionally engages with an inner surface of the elongate stem enclosure 501, while an inner cylindrical element 522 includes a top section that frictionally engages with an inner surface of the sealing ring 524 and a bottom section that frictionally engages with an inner surface of the elongate stem enclosure 501. In one embodiment, the inner cylindrical element 522 is a ferromagnetic component configured to rotate upon inducement of a magnetic force by the electromagnetic actuator 502. In one embodiment, the inner cylindrical element is connected to one or more planet gears 514 by one or more spurs 526. Each of the planet gears 514 include a plurality of teeth intermeshed with teeth lining an inner surface of a ring gear 520, positioned radially outwardly from the one or more planet gears 514, and intermeshed with teeth lining an outer surface of a sun gear 518. The sun gear 518 surrounds and tightly frictionally engages with a portion of the stem 512, rotatably coupled with the stem 512 such that rotation of the sun gear 518 causes rotation of the stem 512. Therefore, in this mechanism, activation of the electromagnetic actuator 502 causes rotation of the inner cylindrical element 522, which causes rotation of the planet gears 514 about the sun gear 518 within the ring gear 520. This causes the sun gear 518, and therefore the stem 512, to turn, blocking or unblocking the lumen 504 of the pipe 506.

FIGS. 13A-15 illustrate a perspective view of a balloon retrofit magnetic rising stem valve according to one embodiment of the present invention. In one embodiment, a pipe 606 including a central lumen 604 includes a top plate 616 connected to a bonnet 617. A stem 612 extends through an opening in the bonnet 617 and an opening in the top plate 616 into the lumen 604 of the pipe 606, such that the stem 612 is able to act as a rising-stem valve 600. At least a portion of the stem 612 external to the bonnet 617 is surrounded by a balloon actuation unit. The balloon actuation unit includes a bottom component 623 connected to a top component 622 (e.g., via adhesive, bolts, screws, welding, etc.). A portion of the top component 622 of the balloon actuation unit is surrounded by magnetic housing 602. In one embodiment, at least one handle 608 extends radially outwardly from the magnetic housing 602 and/or the top component 622 of the balloon actuation unit, such that rotation of the handle 608 causes rotation of the magnetic housing 602 and/or the top component 622. In one embodiment, the handle 608 is able to be supplemented or replaced with an electronic drive mechanism 609, as shown in FIG. 13B, which is able to actuate the valve without physical rotation of the top component 622.

Figure 16:
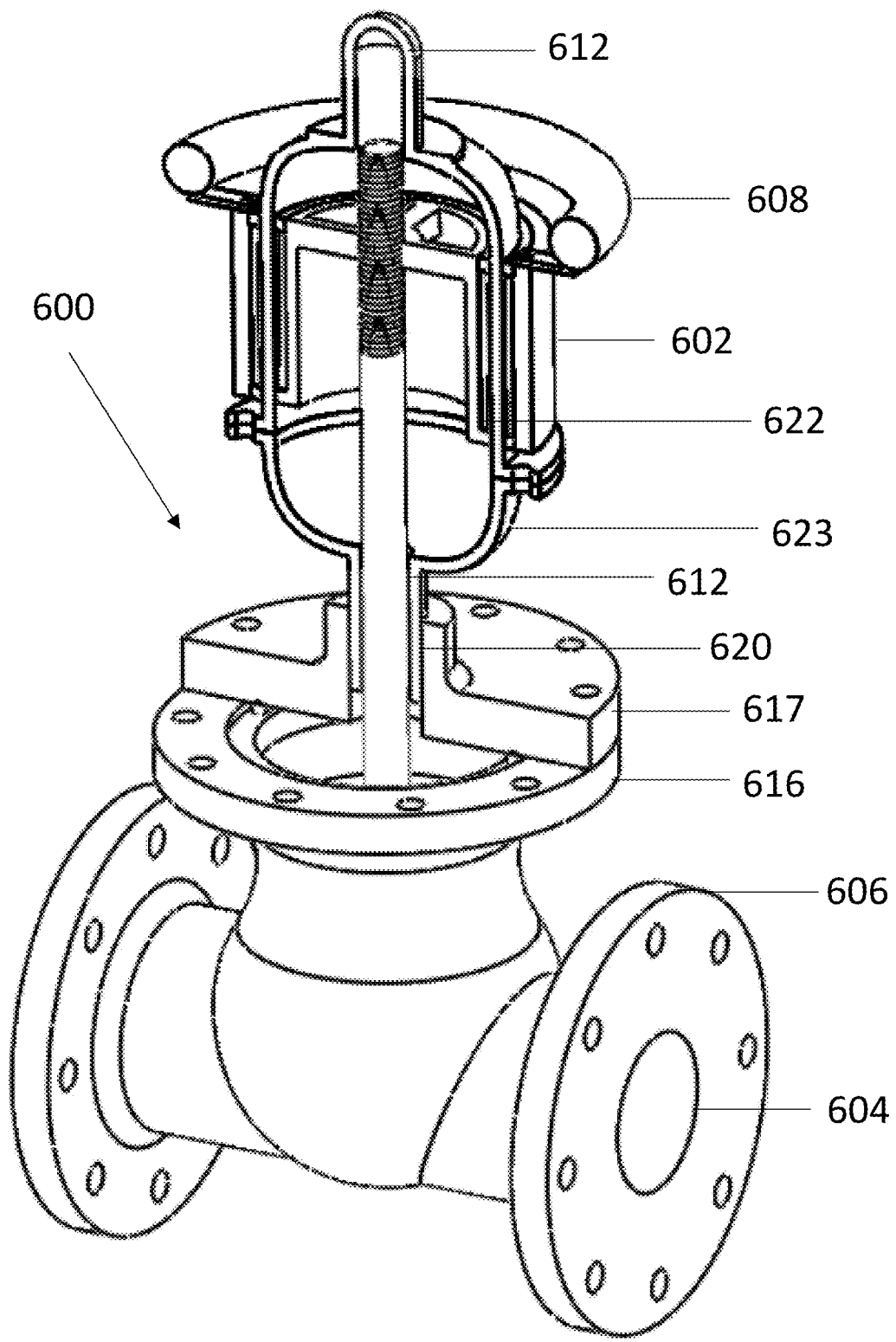
FIG. 16 illustrates a perspective sectional view of a balloon retrofit magnetic rising stem valve according to one embodiment of the present invention.

FIG. 16 illustrates a perspective sectional view of a balloon retrofit electromagnetic rising stem valve according to one embodiment of the present invention. Importantly, the embodiment shown in FIGS. 13A-17 is able to be used with existing stem valve systems, without cutting into the stem or removing the bonnet of the valve system, and only required that the hand crank of the existing valve system be removed. As shown in FIG. 16, in one embodiment, the bottom component 623 of the balloon actuation unit includes a wider radius cup configured to connect to the top component 622 of the balloon actuation unit. A tube 620 having a smaller radius than the cup extends outwardly from the cup of the bottom component. The inner radius of the tube 620 is configured to be substantially the same as the radius of the stem 612, such that the tube 620 tightly fits around the stem 612. In one embodiment, the tube 620 is stuffed between the stem 612 and the bonnet 617 by first removing the sealing packing material that the existing valve includes between the stem 612 and the bonnet 617, such that the tube 620 is able to be inserted into the space. The tube 620 acts as a new seal between the bonnet 617 and the stem 612, so as to prevent leaks. In one embodiment, the outer surface of the tube 620 is surrounded by one or more gaskets so as to better ensure the interface is fully sealed.

The use of the tube 620 of the bottom component 623 to seal the bonnet-stem interface is important, as it allows the balloon actuation unit to be easily retrofit onto existing valve components without removing critical elements of the valve, with only the original packing material and the hand crank being removed.

Figure 17:
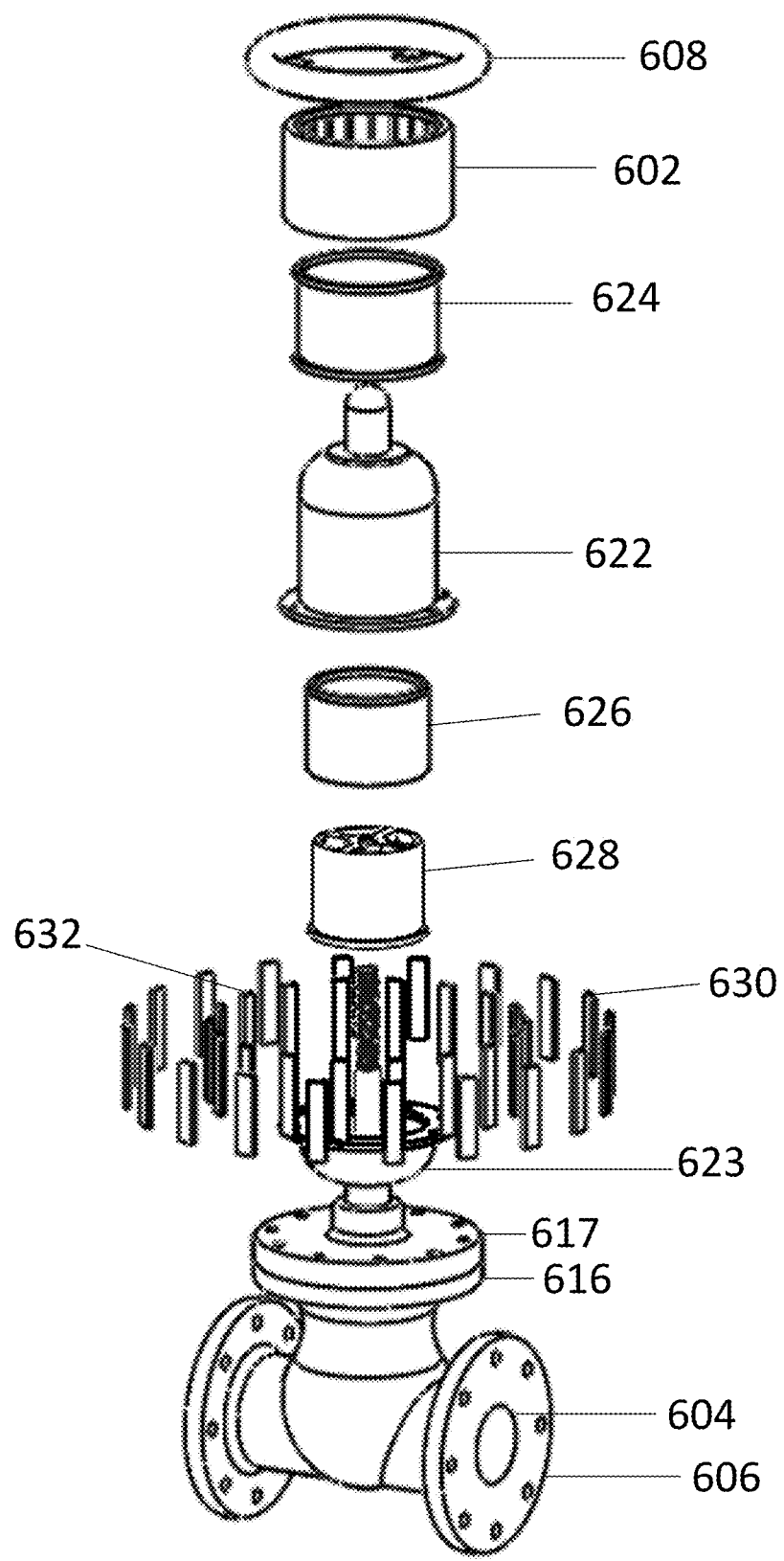
FIG. 17 illustrates an exploded view of a balloon retrofit magnetic rising stem valve according to one embodiment of the present invention.

FIG. 17 illustrates an exploded view of a balloon retrofit electromagnetic rising stem valve according to one embodiment of the present invention. FIG. 17 allows for visualization of each of the components of the balloon retrofit electromagnetic rising stem valve. A plurality of external permanent magnets 630 are contained between an external ring 602 of the magnetic housing and an internal ring 624 of the magnetic housing (which has a slightly smaller radius than the external ring 602), each of which is external to the top component 622 of the balloon actuation unit. In one embodiment, neither the external ring 602 nor the internal ring 624 of the magnetic housing are rotationally coupled to the top component 622, such that the magnetic housing is able to rotate without rotating the balloon actuation unit. The external ring 602 and the internal ring 624 of the magnetic housing are connected (e.g., via adhesive, welding, bolts, screws, frictional engagement, etc.). Because the plurality of external permanent magnets 630 are contained within the magnetic housing, rotation of the magnetic housing also causes rotation of the plurality of external permanent magnets 630. In one embodiment, the handle 608 extends radially outwardly from the exterior surface of the external ring 602 of the magnetic housing and is rotationally coupled to the magnetic housing.

Internally, between the top component 622 and the stem 612, is an external ring 626 of an interior magnetic housing and an internal ring 628 of an interior magnetic housing. The internal ring 628 of the interior magnetic housing is threaded around a portion of the stem 612 and/or frictionally engaged with a portion of the stem 612, such that rotation of the internal ring 628 causes upward or downward movement, but not rotation, of the stem 612. In one embodiment, a plurality of internal permanent magnets 632 are positioned between the external ring 626 and the internal ring 628, and the external ring 626 and the internal ring 628 are connected (e.g., via adhesive, welding, bolts, screws, frictional engagement, etc.). Magnetic force induced on the plurality of internal permanent magnets 632 by rotation of the plurality of external permanent magnets 630 therefore causes rotation of the interior magnetic housing, and also thus causes movement of the stem 612. In one embodiment, the external ring 626 and the internal ring 628 of the interior magnetic housing are not coupled with the top component 622, such that the interior magnetic housing is able to rotate without causing rotation of the top component 622.

One of ordinary skill in the art will understand that, although FIGS. 13A-17 show an embodiment where the magnetic housing is manually rotated, in another embodiment, the manual actuation system is able to be replaced with motors driving the external rotation of the magnetic housing. Furthermore, in yet another embodiment, the plurality of external permanent magnets is able to be replaced with one or more electromagnets, able to be activated so as to generate a rotating magnetic field without physically rotating the magnetic housing.

One of ordinarily skill in the art will understand that, while the exemplary figures shown in this application primarily show gate valves, any type of rising stem valve is compatible with the present invention. For example, in one embodiment, the valve is a gate valve, globe valve, plug valve, ball valve, butterfly valve, needle valve, and/or any other type of rising stem valve.

One of ordinary skill in the art will understand that the industries in which the present invention is able to be deployed are not limited to oil and gas applications, but also extend to nuclear energy applications, cryogenic applications, petrochemical applications, aerospace applications, military and naval applications, and/or any other industries or applications where fluid-carrying valves are used. For example, in one embodiment, the valve is attached to and used with a petroleum pipeline, a natural gas pipeline, a water pipeline, a helium pipeline, a methane pipeline, and/or other chemical pipelines.

Figure 18:
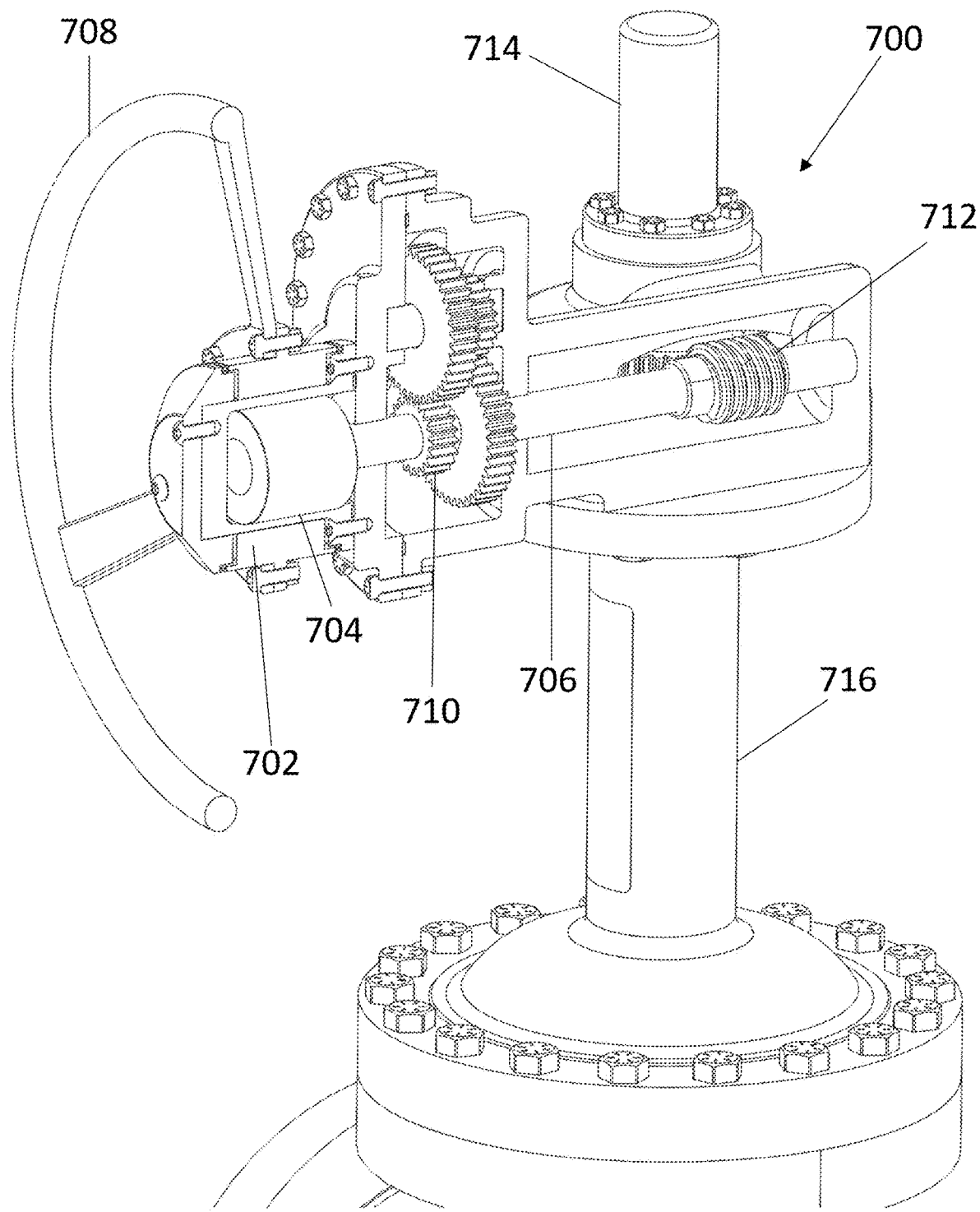
FIG. 18 illustrates a perspective sectional view of a magnetic rising stem valve according to one embodiment of the present invention.
Figure 19:
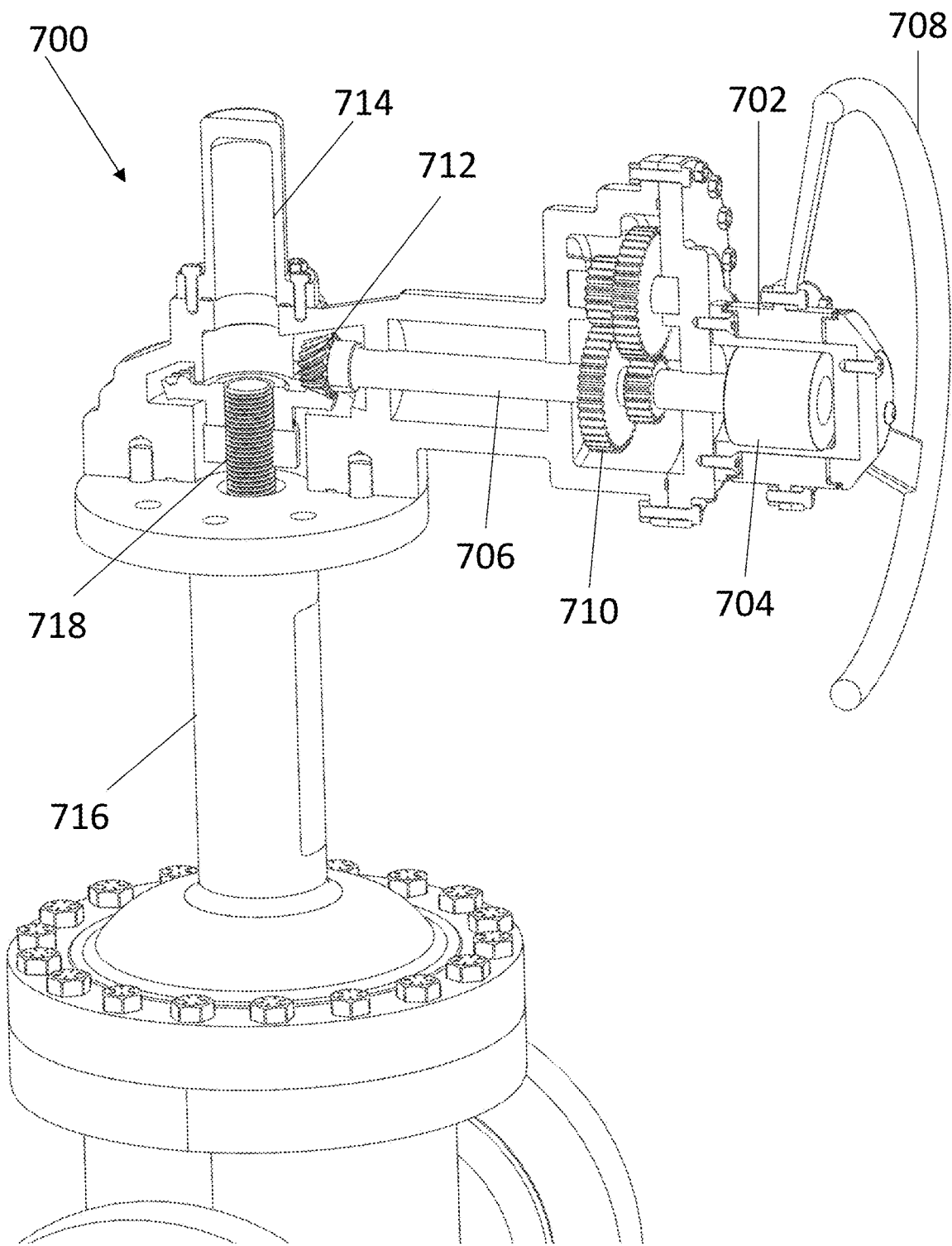
FIG. 19 illustrates a perspective sectional view of a magnetic rising stem valve according to one embodiment of the present invention.

FIGS. 18-19 illustrates a perspective sectional view of a magnetic rising stem valve according to one embodiment of the present invention. In one embodiment, an outer magnetic cartridge 702 rotates, producing force causing an inner magnetic element 704, fully sealed within a pressure vessel of the valve 700, to rotate. The inner magnetic element 704 is rotationally coupled to a first shaft 706 at a proximal end of the first shaft 706. In one embodiment, rotation of the first shaft 706 causes actuation of a gear train 710, allowing for turning of the first shaft 706 with less required force or rotation from outer magnetic cartridge 702. The first shaft 706 is rotationally coupled with a worm gear 712 at the distal end of the first shaft 706. The worm gear 712 is configured to rotate a gear or threaded section 718 of a second shaft. In one embodiment, the second shaft is oriented orthogonal to the first shaft 706, such that the first shaft 706 is able to be oriented horizontally, while the second shaft is vertical. In one embodiment, the pressure vessel of the valve includes a substantially hollow extension 714 substantially parallel to and concentric with the second shaft, allowing the second shaft to rise into the extension 714 when the valve 700 is open, but moved downward out of the extension 714 when the valve is closed.

In one embodiment, the outer magnetic cartridge 702 is rotated by a hand crank 708 and includes one or more fixed permanent magnets or electromagnets. In another embodiment, the outer magnetic cartridge 702 includes one or more electromagnets able to be actuated by at least one actuator, allowing for rotation of a magnetic pole about the inner magnetic element 704 without physical rotation of the outer magnetic cartridge 702. Lack of moving parts reduces the chances of breakdown of the valve requiring replacement due grinding of the parts, reduces the effect of any potential debris that gets between the outer magnetic cartridge 702 and the pressure vessel, and reduces chances of a spark or heat produced due the frictional forces between the outer magnetic cartridge 702 and the pressure vessel. In one embodiment, the valve 700 includes a hand crank 708 operable to allow manual usage, but also is operable to actuate electromagnets without physical rotation, allowing for the use of either system as needed.

Figure 20:
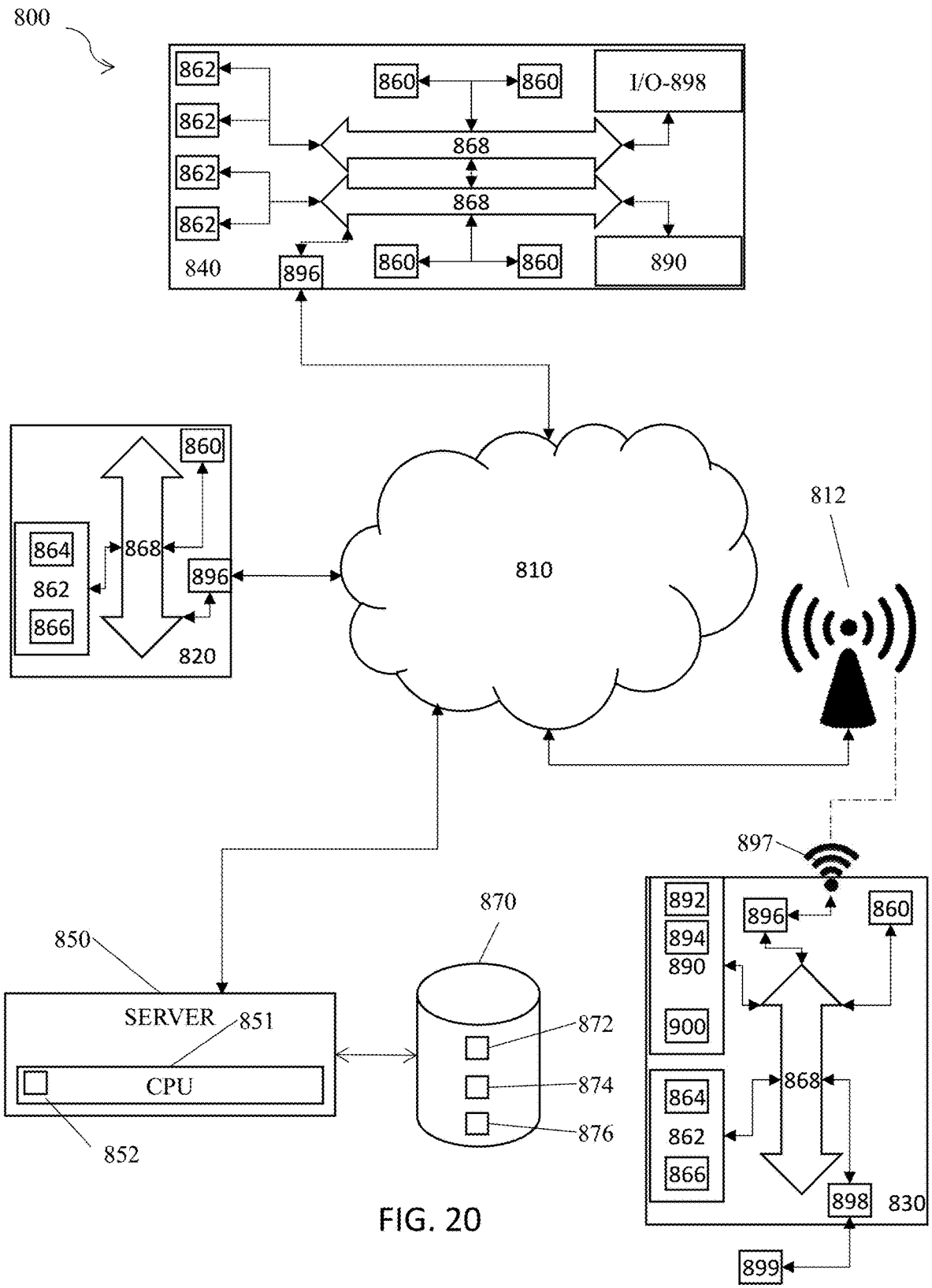
FIG. 20 is a schematic diagram of a system of the present invention.

FIG. 20 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touch pads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 20, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 20, is operable to include other components that are not explicitly shown in FIG. 20, or is operable to utilize an architecture completely different than that shown in FIG. 20. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A magnetically activated rising stem valve, comprising:
a first shaft including a stopper at a first end, wherein the stopper is configured to block a pipe when the valve is in a closed position;
a second shaft, including a distal end rotationally coupled to a second end of the first shaft, such that rotation of the second shaft causes rotation of the first shaft;
an inner permanent magnetic element attached to a proximal end of the second shaft;
a valve housing surrounding the first shaft, the second shaft, and the inner permanent magnetic element, wherein the valve housing is sealed and defines a pressure vessel of the valve;
an outer magnetic cartridge surrounding a section of the valve housing around the inner permanent magnetic element; and
an actuator configured to activate one or more electromagnets in the outer magnetic cartridge;
wherein actuation of the one or more electromagnets does not physically rotate the outer magnetic cartridge relative to the valve housing;
wherein the first shaft and the second shaft are rotationally coupled by at least one gear element; and
wherein the at least one gear element includes a gear attached to a second end of the first shaft opposite the first end of the first shaft, wherein the gear includes one or more prongs attached to an inner side wall of the valve housing, retaining the position of the gear in place during actuation.

2. The valve of claim 1, wherein a central axis of the first shaft is substantially orthogonal to a central axis of the second shaft.

3. The valve of claim 1, wherein the second shaft includes a first section and a second section connected by a gear train, where the first section is coupled with the first shaft and the second section is connected with the inner permanent magnetic element.

4. The valve of claim 1, the valve housing includes a substantially hollow extension, wherein the substantially hollow extension is parallel to and concentric with the first shaft such that the substantially hollow extension is configured to receive the first shaft.

5. The valve of claim 1, wherein the first shaft is part of a preexisting valve system, and the second shaft, the valve housing, and the outer magnetic cartridge are retrofit around the first shaft.

6. The valve of claim 1, wherein the pipe transports petroleum or natural gas.

7. A magnetically activated rising stem valve, comprising:
a first shaft including a stopper at a first end, wherein the stopper is configured to block a pipe when the valve is in a closed position;
a second shaft, including a distal end rotationally coupled to a second end of the first shaft, such that rotation of the second shaft causes rotation of the first shaft;
an inner permanent magnetic element attached to a proximal end of the second shaft;
a valve housing surrounding the first shaft, the second shaft, and the inner permanent magnetic element, wherein the valve housing is sealed and defines a pressure vessel of the valve; and
an outer magnetic cartridge surrounding a section of the valve housing around the inner permanent magnetic element;
wherein the first shaft and the second shaft are rotationally coupled by at least one gear element, including a beveled gear attached to the distal end of the second shaft;
wherein the at least one gear element includes a gear attached to the second end of the first shaft, wherein the gear includes one or more retainers attached to an inner side wall of the valve housing, retaining the position of the gear in place during actuation;
wherein a central axis of the first shaft is substantially orthogonal to a central axis of the second shaft;
wherein the outer magnetic cartridge includes one or more electromagnets operable to be activated by an actuator; and
wherein activation of the one or more electromagnets does not physically rotate the outer magnetic cartridge relative to the valve housing.

8. The valve of claim 7, the valve housing includes a substantially hollow extension, wherein the substantially hollow extension is parallel to and concentric with the first shaft such that the substantially hollow extension is configured to receive the first shaft.

9. The valve of claim 7, wherein the second shaft includes a first section and a second section connected by a gear train, where the first section is coupled with the first shaft and the second section is connected with the inner permanent magnetic element.

10. The valve of claim 7, wherein the first shaft is part of a preexisting valve system, and the second shaft, the valve housing, and the outer magnetic cartridge are retrofit around the first shaft.

11. The valve of claim 7, wherein the pipe transports petroleum or natural gas.

12. The valve of claim 7, further comprising a hand crank attached to the outer magnetic cartridge.

13. A magnetically activated rising stem valve, comprising:
- a first shaft including a stopper at a first end, wherein the stopper is configured to block a pipe when the valve is in a closed position;
- a second shaft, including a distal end rotationally coupled to a second end of the first shaft, such that rotation of the second shaft causes rotation of the first shaft;
- an inner permanent magnetic element attached to a proximal end of the second shaft;
- a valve housing surrounding the first shaft, the second shaft, and the inner permanent magnetic element, wherein the valve housing is sealed and defines a pressure vessel of the valve; and
- an outer magnetic cartridge surrounding a section of the valve housing around the inner permanent magnetic element;
- wherein the first shaft and the second shaft are rotationally coupled by at least one gear element;
- wherein the first shaft is part of a preexisting valve system, and the second shaft, the valve housing, and the outer magnetic cartridge are retrofit around the first shaft;
- wherein the pipe transports petroleum or natural gas;
- wherein the outer magnetic cartridge includes one or more electromagnets operable to be activated by an actuator; and
- wherein activation of the one or more electromagnets does not physically rotate the outer magnetic cartridge relative to the valve housing; and
- wherein the at least one gear element includes a gear attached to a second end of the first shaft opposite the first end of the first shaft, wherein the gear includes one or more prongs attached to an inner side wall of the valve housing, retaining the position of the gear in place during actuation.

14. The valve of claim 13, wherein a central axis of the first shaft is substantially orthogonal to a central axis of the second shaft.

15. The valve of claim 13, wherein the one or more electromagnets are activated in a way so that a rotating magnetic field is generated.

* * * * *